US012713492B2

(12) United States Patent
Lou et al.

(10) Patent No.: US 12,713,492 B2
(45) Date of Patent: Aug. 18, 2026

(54) COMMUNICATION METHOD AND APPARATUS

(71) Applicant: HUAWEI TECHNOLOGIES CO., LTD., Shenzhen (CN)

(72) Inventors: Chong Lou, Shanghai (CN); Mengying Ding, Shanghai (CN); Rui Wang, Shanghai (CN); Jinlin Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 303 days.

(21) Appl. No.: 18/519,515

(22) Filed: Nov. 27, 2023

(65) Prior Publication Data

US 2024/0098836 A1 Mar. 21, 2024

Related U.S. Application Data

(63) Continuation of application No. PCT/CN2022/074654, filed on Jan. 28, 2022.

(30) Foreign Application Priority Data

May 28, 2021 (CN) ......................... 202110594553.4

(51) Int. Cl.

*H04W 76/27* (2018.01)
*H04W 72/23* (2023.01)
*H04W 74/0833* (2024.01)

(52) U.S. Cl.

CPC ........... *H04W 76/27* (2018.02); *H04W 72/23* (2023.01); *H04W 74/0833* (2013.01)

(58) Field of Classification Search

None

See application file for complete search history.

(56) References Cited

U.S. PATENT DOCUMENTS 10,075,903 B2 * 9/2018 Lee ......................... H04W 4/06
12,470,980 B2 * 11/2025 Kim ......................... H04L 67/52

(Continued)

FOREIGN PATENT DOCUMENTS

CN 109391951 A 2/2019
WO 2020226397 A1 11/2020
WO 2021026906 A1 2/2021

OTHER PUBLICATIONS

3GPP TS 38.323 V16.3.0 (Mar. 2021), 3rd Generation Partnership Project; Technical Specification Group Radio Access Network; NR; Packet Data Convergence Protocol (PDCP) specification (Release 16), total 38 pages.

(Continued)

*Primary Examiner* — Chirag G Shah

(74) *Attorney, Agent, or Firm* — HAUPTMAN HAM, LLP

(57) ABSTRACT

A communication method and apparatus are provided. The method includes: A terminal device sends first data to a network device through a first cell group in an activated state. The terminal device receives a first message from the network device, where the first message is used to deactivate the first cell group. The terminal device changes a state of the first cell group from the activated state to a deactivated state based on the first message of the network device. If the terminal device receives no success acknowledgment of the first data and/or there is second data that has not been transmitted in the first cell group, the terminal device retransmits the first data and/or sends the second data to the network device through a second cell group in an activated state.

17 Claims, 15 Drawing Sheets

(56) References Cited

U.S. PATENT DOCUMENTS

2018/0049243 A1 2/2018 Lee et al.
2019/0394693 A1* 12/2019 Kim ...................... H04W 36/30
2020/0205034 A1* 6/2020 Tang ..................... H04W 76/15
2020/0305216 A1 9/2020 Kim
2022/0030659 A1* 1/2022 Kim ...................... H04W 28/06
2022/0046522 A1* 2/2022 Kim ...................... H04W 48/16
2022/0150693 A1* 5/2022 Kim .................... H04W 12/033
2022/0225453 A1* 7/2022 Kim ...................... H04W 76/20
2022/0322418 A1* 10/2022 Kim ...................... H04W 28/18
2022/0418002 A1* 12/2022 Dinan ................. H04W 52/146
2023/0336309 A1* 10/2023 Zhuang ..................... G01S 5/00
2024/0064785 A1* 2/2024 Tsuboi .................. H04W 76/27

OTHER PUBLICATIONS

3rd Generation Partnership Project; Technical Specification Group Radio Access Network; NR;Radio Resource Control (RRC) protocol specification(Release 15) 3GPP TS 38.331 V15.13.0 (Mar. 2021) total 540pages.

3rd Generation Partnership Project; Technical Specification Group Radio Access Network; NR;Medium Access Control (MAC) protocol specification(Release 15) 3GPP TS 38.321 V15.12.0 (Mar. 2021) total:79pages.

3rd Generation Partnership Project; Technical Specification Group Radio Access Network; Evolved Universal Terrestrial Radio Access (E-UTRA) and NR;Multi-connectivity;Stage 2(Release 15),3GPP TS 37.340 V15.12.0 (Mar. 2021), total:71pages.

Extended European Search Report issued in corresponding European Application No. 22810074.9, dated Sep. 27, 2024, pp. 1-8.

Notice of Preliminary Rejection issued in KR10-2023-7044617 dated Oct. 26, 2025.

* cited by examiner

| R | R | R | R | R | Cell group 1 | Cell group 2 | Cell group 3 |
|---|---|---|---|---|---|---|---|

| R | R | R | R | R | Cell group identifier |
|---|---|---|---|---|---|

| R | R | R | R | R | R | T1 | T0 |
|---|---|---|---|---|---|---|---|

| R | R | R | R | R | Cell group 1 | Cell group 2 | Cell group 3 |
|---|---|---|---|---|---|---|---|
| C7 | C6 | C5 | C4 | C3 | C2 | C1 | R |

| R | R | R | R | R | Cell group identifier | | |
|---|---|---|---|---|---|---|---|
| C7 | C6 | C5 | C4 | C3 | C2 | C1 | R |

| R | R | R | R | R | R | T1 | T0 |
|---|---|---|---|---|---|---|---|
| C7 | C6 | C5 | C4 | C3 | C2 | C1 | R |

COMMUNICATION METHOD AND APPARATUS

CROSS-REFERENCE TO RELATED APPLICATIONS

This application is a continuation of International Application No. PCT/CN2022/074654, filed on Jan. 28, 2022, which claims priority to Chinese Patent Application No. 202110594553.4, filed on May 28, 2021. The disclosures of the aforementioned applications are hereby incorporated by reference in their entireties.

TECHNICAL FIELD

Embodiments of this application relate to the field of communication technologies, and in particular, to a communication method and apparatus.

BACKGROUND

Currently, in new radio (NR), a frequency band with a higher frequency and a service with a higher throughput requirement are introduced. To cope with convergence and coverage of different frequencies, multi-connectivity is proposed. In the multi-connectivity, there is one master node (MN) and at least one secondary node (SN). A cell through which the master node provides air interface resource coverage for a terminal device is referred to as a master cell group, and a cell through which the secondary node provides air interface resource coverage for the terminal device is referred to as a secondary cell group. Currently, how to ensure lossless data transmission is a hot research point.

SUMMARY

Embodiments of this application provide a communication method and apparatus, to ensure lossless data transmission.

According to a first aspect, a communication method is provided, and includes: A terminal device sends first data to a network device through a first cell group in an activated state in a plurality of cell groups of the terminal device. The terminal device receives a first message from the network device, where the first message is used to deactivate the first cell group. The terminal device changes a state of the first cell group from the activated state to a deactivated state based on the first message. If the terminal device receives no success acknowledgment of the first data and/or there is second data that has not been transmitted in the first cell group, the terminal device retransmits the first data and/or sends the second data to the network device through a second cell group in an activated state in the plurality of cell groups. Optionally, the plurality of cell groups include a master cell group and secondary cell groups, and there are at least two secondary cell groups. That the terminal device receives no success acknowledgment of the first data includes: The terminal device receives no ACK of the first data, the terminal device receives a NACK of the first data, or the like.

According to the foregoing design, after the first cell group of the terminal device is deactivated, the terminal device may retransmit, to the network device through the second cell group, the first data that has not been received, and/or transmit, to the network device through the second cell group, the second data that has not been transmitted in the first cell group. This can avoid a data loss caused by deactivation of the first cell group, and can ensure lossless data transmission.

In a possible design, when the first cell group is changed from the activated state to the deactivated state, a PDCP entity anchor is not changed, reestablishment of a PDCP entity does not occur in UE, and an entity to which the PDCP entity sends the first data and/or the second data is changed from a first RLC entity associated with the first cell group to a second RLC entity associated with the second cell group; or when the first cell group is changed from the activated state to the deactivated state, a PDCP entity anchor is changed, reestablishment of a PDCP entity occurs in UE, the PDCP entity before the change sends the first data to a first RLC entity associated with the first cell group, and the PDCP entity after the change retransmits the first data and/or sends the second data to a second RLC entity associated with the second cell group.

Optionally, that a PDCP entity anchor is changed includes: A security key of the PDCP entity is changed from a first PDCP security key to a second PDCP security key, the PDCP security key is used for encryption and/or integrity protection, the first PDCP security key is associated with the first cell group, and the second PDCP security key is associated with the second cell group. Alternatively, that a PDCP entity anchor is not changed includes: A PDCP security key of the PDCP entity is not changed, and the security key is associated with any cell group of the UE. The any cell group may be the first cell group and/or the second cell group, may be another cell group of the UE, or the like. This is not limited.

Optionally, when the terminal device deactivates the first cell group based on the first message, the terminal device performs, on a cell associated with the deactivated first cell group, at least one of the following operations: skipping monitoring a PDCCH, skipping receiving a DL-SCH, skipping sending an SRS, skipping sending a UL-SCH, or the like.

In a possible design, the terminal device may perform, on the deactivated first cell group, at least one of the following operations: maintaining uplink synchronization, maintaining downlink synchronization, detecting a link status, or the like.

According to the foregoing design, the terminal device may monitor link quality in real time, so that when the first cell group is reactivated, the terminal device can learn of the link quality in time, to ensure that data transmission is not interrupted.

For example, a process in which the terminal device maintains uplink synchronization on the deactivated first cell group may include: The terminal device runs an uplink timing advance timer TAT associated with the first cell group, where when the TAT expires, a TA value of the first cell group is invalid, and the terminal device obtains a new timing advance TA value.

In a possible design, a process in which the terminal device obtains the new TA value includes: The terminal device sends indication information to the network device through the second cell group in the activated state, where the indication information indicates the network device to deliver the new TA value of the first cell group. The terminal device receives a TA value from the network device through the second cell group, where the TA value is the new TA value of the first cell group.

Alternatively, in a possible design, that the terminal device obtains the new TA value includes: The terminal device initiates random access to the network device through the first cell group. The terminal device receives, through the first cell group, a TA value sent by the network device in a random access process, where the TA value is the new TA value of the first cell group.

Optionally, after the terminal device obtains the new TA value of the first cell group, the terminal device may actively activate the first cell group, continue keeping the first cell group in the deactivated state, or the like. This is not limited.

In a possible design, when the terminal device maintains uplink synchronization on the first cell group, and when new data in the terminal device arrives at the first cell group, the method further includes: The terminal device sends indication information to the network device through the second cell group, where the indication information indicates the network device to activate the first cell group; or the terminal device sends a scheduling request SR to the network device through the first cell group, to request the network device to activate the first cell group.

In another possible design, when the first cell group is in the deactivated state, the terminal device performs, on the first cell group, at least one of following operations: skipping maintaining uplink synchronization, skipping maintaining downlink synchronization, skipping detecting a link status, or the like.

According to the foregoing design, if when the first cell group is deactivated, the terminal device no longer maintains uplink synchronization or downlink synchronization, detects the link status, or the like, power consumption of the terminal device can be reduced.

For example, when the terminal device does not maintain uplink synchronization on the first cell group, if new data in the terminal device arrives at the first cell group, the method further includes: The terminal device sends indication information to the network device through the second cell group, where the indication information indicates the network device to activate the first cell group; or the terminal device initiates random access to the network device through the first cell group, to enable the network device to determine that the first cell group of the terminal device needs to enter the activated state.

In a possible design, the method further includes: The terminal device sends a second message to the network device, where the second message is used to assist the network device in activating and/or deactivating at least one cell group of the terminal device. Optionally, the second message may indicate at least one of the following: a link status of the at least one cell group of the terminal device, a cell group recommended or preferred by the terminal device to be activated and/or deactivated, a case in which there is to-be-sent data in the at least one cell group of the terminal device, or a data volume of the to-be-sent data in the at least one cell group of the terminal device.

In a possible design, the method further includes: The terminal device receives a third message from the network device, where the third message is used to configure the at least one cell group for the terminal device.

In a possible design, after the terminal device performs an operation of activating and/or deactivating a cell group based on the first message, if there is no master cell group in the cell group activated by the terminal device, the method further includes: The terminal device receives indication information from the network device, where the indication information may also be referred to as master cell group validation indication information. The terminal device determines, based on the indication information, a master cell group in secondary cell groups activated by the terminal device; or the terminal device determines a master cell group in activated secondary cell groups according to a predefined rule.

According to the foregoing design, when there is no master cell group in the cell group activated by the terminal device, the activated secondary cell groups may be changed to the master cell group, to ensure that a function of the master cell group is not interrupted, thereby ensuring continuity of data transmission.

In a possible design, the method further includes: The terminal device receives a fourth message from the network device, where the fourth message is used to configure a function of the master cell group for the secondary cell group of the terminal device; and the secondary cell group having the function of the master cell group is changed to the master cell group.

In a possible design, the method further includes: The terminal device determines a traffic steering rule based on a cell group currently activated by the terminal device. The terminal device performs traffic steering on uplink data according to the traffic steering rule.

According to the foregoing design, the terminal device may dynamically adjust the traffic steering rule based on different activated cell groups, so that the traffic steering rule adapts to a network load, a channel status, and the like, to improve communication performance.

In a possible design, the method further includes: The terminal device receives a fifth message from the network device, where the fifth message is used to configure at least one traffic steering rule for the terminal device.

According to a second aspect, a communication method is provided, and includes: A network device receives first data from a terminal device through a first cell group in an activated state in a plurality of cell groups of the terminal device. The network device sends a first message to the terminal device, where the first message is used to deactivate the first cell group. If the network device does not send a success acknowledgment of the first data and/or there is second data that has not been transmitted in the first cell group, the network device receives the first data and/or the second data from the terminal device through a second cell group in an activated state in the plurality of cell groups. Optionally, the plurality of cell groups include a master cell group and secondary cell groups, and there are at least two secondary cell groups.

According to the foregoing design, when a cell group of the terminal device is deactivated, another cell group in the activated state of the terminal device, for example, the second cell group, may be used to retransmit, to the network device, the first data whose success acknowledgment is not received in the first cell group and/or the second data that has not been transmitted in the first cell group, to ensure lossless data transmission.

In a possible design, when the first cell group is in a deactivated state, the terminal device maintains uplink synchronization on the first cell group, and if a timing advance TA value of the first cell group is invalid, the method further includes:

The network device receives indication information from the terminal device through the second cell group, where the indication information indicates the network device to send a new TA value of the first cell group. The network device sends the new TA value of the first cell group to the terminal device through the second cell group.

In a possible design, when the first cell group is in a deactivated state, the terminal device maintains uplink synchronization on the first cell group, and if a TA value of the first cell group is invalid, the method further includes: The network device receives, through the first cell group, random access initiated by the terminal device. The network device sends a new TA value of the first cell group to the terminal device through the first cell group in a random access process.

In a possible design, when new data in the terminal device arrives at the first cell group, the method further includes: The network device sends indication information to the terminal device through the second cell group, where the indication information indicates the terminal device to activate the first cell group; or the network device receives a scheduling request SR from the terminal device through the first cell group. The network device activates the first cell group of the terminal device.

In a possible design, when the first cell group is in a deactivated state, the terminal device does not maintain uplink synchronization on the first cell group, and when new data in the terminal device arrives at the first cell group, the method further includes: The network device sends indication information to the terminal device through the second cell group, where the indication information indicates the network device to activate the first cell group; or the network device receives, through the first cell group, random access initiated by the terminal device. The network device activates the first cell group of the terminal device.

In a possible design, the method further includes: The network device sends a second message to the terminal device, where the second message is used to assist the network device in activating and/or deactivating at least one of the plurality of cell groups of the terminal device, and the second message indicates at least one of the following: a link status of the at least one cell group of the terminal device, at least one cell group recommended by the terminal device to be activated and/or deactivated, a case in which there is to-be-sent data in the at least one cell group of the terminal device, or a data volume of the to-be-sent data in the at least one cell group of the terminal device.

In a possible design, the method further includes: The network device sends a third message to the terminal device, where the third message is used to configure the plurality of cell groups for the terminal device.

In a possible design, the method further includes: The network device sends indication information to the terminal device, where the indication information is used to determine a master cell group in secondary cell groups activated by the terminal device.

In a possible design, the method further includes: The network device sends a fourth message to the terminal device, where the fourth message is used to configure a function of the master cell group for the secondary cell group of the terminal device; and the secondary cell group having the function of the master cell group is changed to the master cell group.

In a possible design, the method further includes: The network device sends a fifth message to the terminal device, where the fifth message is used to configure at least one traffic steering rule for the terminal device.

According to a third aspect, a communication method is provided. The method includes: A network device sends first data to a terminal device through a first cell group in an activated state in a plurality of cell groups. The network device sends a first message to the terminal device, where the first message is used to deactivate the first cell group. If the network device receives no success acknowledgment of the first data and/or there is second data that has not been transmitted in the first cell group, the network device retransmits the first data and/or sends the second data to the terminal device through a second cell group in an activated state in the plurality of cell groups. Optionally, the plurality of cell groups include a master cell group and secondary cell groups, and there are at least two secondary cell groups.

According to the foregoing design, a downlink data loss caused by deactivation of a cell group can be avoided, and lossless transmission of downlink data can be implemented.

In a possible design, when the first cell group is changed from the activated state to a deactivated state, a PDCP entity anchor is not changed, the plurality of cell groups are associated with one PDCP entity, and the PDCP entity is located in any network device, for example, may be located in a master node or a secondary node. This is not limited. For example, the first cell group is associated with a first network device, and the second cell group is associated with a second network device. In the foregoing design, the first network device may send the first data and/or the second data to the second network device, and then, the second network device sends the first data and/or the second data to the terminal device through the second cell group. Optionally, in this design, regardless of whether the first cell group or the second cell group is used to send the first data and/or the second data to the terminal device, a PDCP security key of the first data and/or a PDCP security key of the second data are/is not changed.

In a possible design, when the first cell group is changed from the activated state to a deactivated state, a PDCP entity anchor is changed, and each of the plurality of cell groups is associated with a PDCP entity corresponding to the cell group. In other words, there is a PDCP entity in each network device. For example, a first network device associated with the first cell group includes a first PDCP entity, and a second network device associated with the second cell group includes a second PDCP entity. The first network device may send the first data and/or the second data to the second network device. The second network device sends the first data and/or the second data to the terminal device through the second cell group. Optionally, the first network device may perform encryption, integrity protection, and the like on the first data by using a first PDCP security key of the first PDCP entity. The second network device may perform encryption, integrity protection, and the like on the first data and/or the second data by using a second PDCP security key of the second PDCP entity.

According to a fourth aspect, a communication method is provided. The method includes: A terminal device receives first data from a network device through a first cell group in an activated state in a plurality of cell groups. The terminal device receives a first message from the network device, where the first message is used to deactivate the first cell group. If the terminal device does not send a success acknowledgment of the first data and/or there is second data that has not been transmitted in the first cell group, the terminal device receives the first data and/or the second data from the network device through a second cell group in an activated state in the plurality of cell groups. Optionally, the plurality of cell groups include a master cell group and secondary cell groups, and there are at least two secondary cell groups.

According to the foregoing design, a downlink data loss caused by deactivation of a cell group can be avoided, and lossless transmission of downlink data can be implemented.

According to a fifth aspect, a communication apparatus is provided. The apparatus is configured to implement the method in the first aspect or the fourth aspect, and includes corresponding function modules or units that are respectively configured to implement steps in the method in the first aspect or the fourth aspect. The functions may be implemented by hardware, or may be implemented by hardware executing corresponding software. The hardware or the software includes one or more modules or units corresponding to the foregoing functions.

According to a sixth aspect, a communication apparatus is provided. The apparatus includes a processor and a memory. The memory is configured to store a computer program or instructions, and the processor is coupled to the memory. When the processor executes the computer program or the instructions, the apparatus is enabled to perform the method in the first aspect or the fourth aspect.

According to a seventh aspect, a communication apparatus is provided. The apparatus is configured to implement the method in the second aspect or the third aspect, and includes corresponding function modules or units that are respectively configured to implement steps in the method in the second aspect or the third aspect. The functions may be implemented by hardware, or may be implemented by hardware executing corresponding software. The hardware or the software includes one or more modules or units corresponding to the foregoing functions.

According to an eighth aspect, a communication apparatus is provided. The apparatus includes a processor and a memory. The memory is configured to store a computer program or instructions, and the processor is coupled to the memory. When the processor executes the computer program or the instructions, the apparatus is enabled to perform the method in the second aspect or the third aspect.

According to a ninth aspect, a computer-readable storage medium is provided. The computer-readable storage medium stores a computer program or instructions, and when the computer program or the instructions are executed by an apparatus, the apparatus is enabled to perform the method in the first aspect or the fourth aspect.

According to a tenth aspect, a computer-readable storage medium is provided. The computer-readable storage medium stores a computer program or instructions, and when the computer program or the instructions are executed by an apparatus, the apparatus is enabled to perform the method in the second aspect or the third aspect.

According to an eleventh aspect, a computer program product is provided. The computer program product includes a computer program or instructions, and when the computer program or the instructions are executed by an apparatus, the apparatus is enabled to perform the method in the first aspect or the fourth aspect.

According to a twelfth aspect, a computer program product is provided. The computer program product includes a computer program or instructions, and when the computer program or the instructions are executed by an apparatus, the apparatus is enabled to perform the method in the second aspect or the third aspect.

According to a thirteenth aspect, a system is provided. The system includes the apparatus in the fifth aspect or the sixth aspect and the apparatus in the seventh aspect or the eighth aspect.

DESCRIPTION OF EMBODIMENTS

The following describes the technical solutions in embodiments of this application with reference to the accompanying drawings in embodiments of this application.

Figure 1:
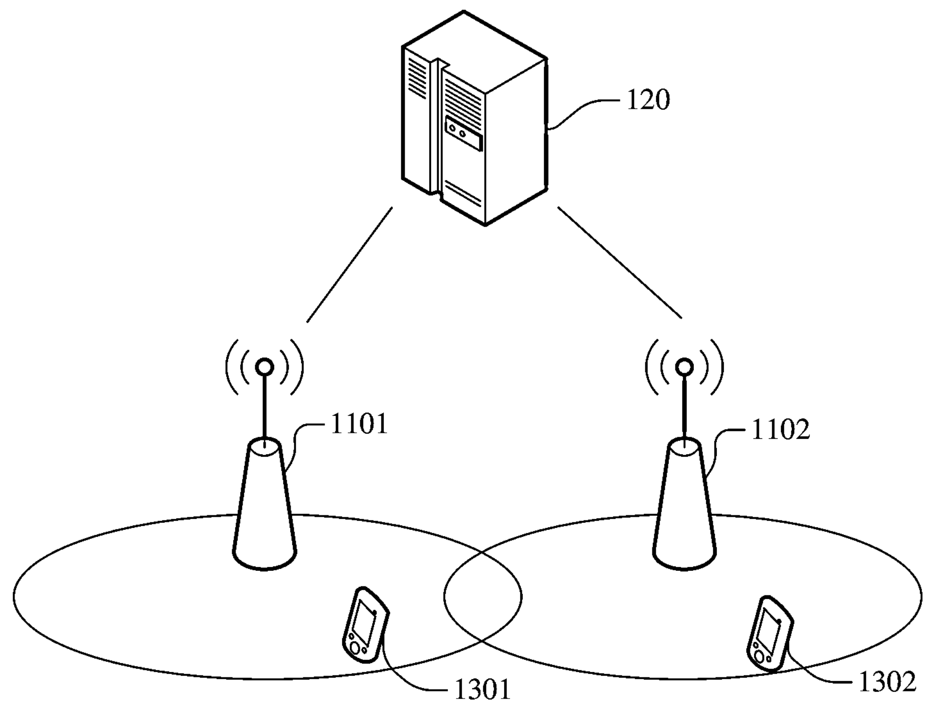
FIG. 1 is a schematic diagram of a network architecture according to an embodiment of this application.

FIG. 1 is a schematic diagram of a network architecture to which an embodiment of this application is applicable. As shown in FIG. 1, a terminal device (for example, a terminal device 1301 or a terminal device 1302) may access a wireless network, to obtain a service of an external network (for example, the Internet) through the wireless network, or communicate with another device through the wireless network, for example, may communicate with another terminal device. The wireless network includes a radio access network (RAN) and a core network (CN). The RAN is configured to connect the terminal device to the wireless network, and the CN is configured to: manage the terminal device and provide a gateway for communicating with the external network.

The following separately describes in detail the terminal device, the RAN, and the CN in FIG. 1.

1. Terminal Device

The terminal device may be referred to as a terminal for short, and is a device with a wireless transceiver function. The terminal device may be mobile or fixed. The terminal device may be deployed on land, including indoor or outdoor deployment, or handheld or vehicle-mounted deployment, may be deployed on water (for example, on a ship), or may be deployed in air (for example, on an airplane, a balloon, or a satellite). The terminal device may be a mobile phone, a tablet computer, a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in a smart grid, a wireless terminal device in transportation safety, a wireless terminal device in a smart city, and/or a wireless terminal device in a smart home. Alternatively, the terminal device may be a cellular phone, a cordless phone, a session initiation protocol (SIP) phone, a wireless local loop (WLL) station, a personal digital assistant (PDA), a handheld device or a computing device with a wireless communication function, a vehicle-mounted device, a wearable device, a terminal device in a 5th generation (5G) network, a terminal device in a future evolved public land mobile network (PLMN), or the like. Sometimes, the terminal device may also be referred to as user equipment (UE). Optionally, the terminal device may communicate with a plurality of access network devices in different technologies. For example, the terminal device may communicate with an access network device supporting long term evolution (LTE), or may communicate with an access network device supporting 5G, or may be in dual connectivity with the access network device supporting LTE and the access network device supporting 5G. This is not limited in embodiments of this application.

In embodiments of this application, an apparatus configured to implement a function of the terminal device may be a terminal device, or may be an apparatus that can support the terminal device in implementing the function, for example, a chip system, a hardware circuit, a software module, or a combination of the hardware circuit and the software module. The apparatus may be installed in the terminal device or may be used together with the terminal device. In the technical solutions provided in embodiments of this application, an example in which the apparatus configured to implement the function of the terminal device is a terminal device and the terminal device is UE is used to describe the technical solutions provided in embodiments of this application. 2. RAN The RAN may include one or more RAN devices, such as a RAN device 1101 and a RAN device 1102. An interface between the RAN device and the terminal device may be a Uu interface (or referred to as an air interface). In future communication, names of these interfaces may remain unchanged, or may be replaced with other names. This is not limited in this application.

The RAN device may be a node or a device that connects the terminal device to a wireless network, and the RAN device may also be referred to as a network device or a base station. For example, the RAN device includes but is not limited to: a base station, a next generation NodeB (gNB), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmission and reception point (TRP), a transmission point (TP), and/or a mobile switching center in 5G. Alternatively, the access network device may be at least one of the following: a wireless controller, a central unit (CU), a distributed unit (DU), a central unit control plane (CU-CP) node, a central unit user plane (CU-UP) node, an integrated access and backhaul (IAB) node, or the like in a cloud radio access network (CRAN) scenario. Alternatively, the access network device may be a relay station, an access point, a vehicle-mounted device, a terminal device, a wearable device, an access network device in the 5G network, an access network device in the future evolved public land mobile network (PLMN), or the like.

In embodiments of this application, an apparatus configured to implement a function of the access network device may be an access network device, or may be an apparatus that can support the access network device in implementing the function, for example, a chip system, a hardware circuit, a software module, or a combination of the hardware circuit and the software module. The apparatus may be installed in the access network device or may be used together with the access network device. In embodiments of this application, the chip system may include a chip, or may include a chip and another discrete component. In the technical solutions provided in embodiments of this application, an example in which the apparatus configured to implement the function of the access network device is an access network device and the access network device is a base station is used to describe the technical solutions provided in embodiments of this application.

(1) Protocol Stack Structure

Communication between the RAN device and the terminal device complies with a specific protocol stack structure. The protocol stack structure may include a control plane protocol stack structure and a user plane protocol stack structure. For example, the control plane protocol stack structure may include functions of protocol stacks such as a radio resource control (RRC) layer, a packet data convergence protocol (PDCP) layer, a radio link control (RLC) layer, a media access control (MAC) layer, and a physical layer. For example, the user plane protocol stack structure may include functions of protocol stacks such as a PDCP layer, an RLC layer, a MAC layer, and a physical layer. In a possible implementation, a service data adaptation protocol (SDAP) layer may be further included above the PDCP layer.

Figure 2A:
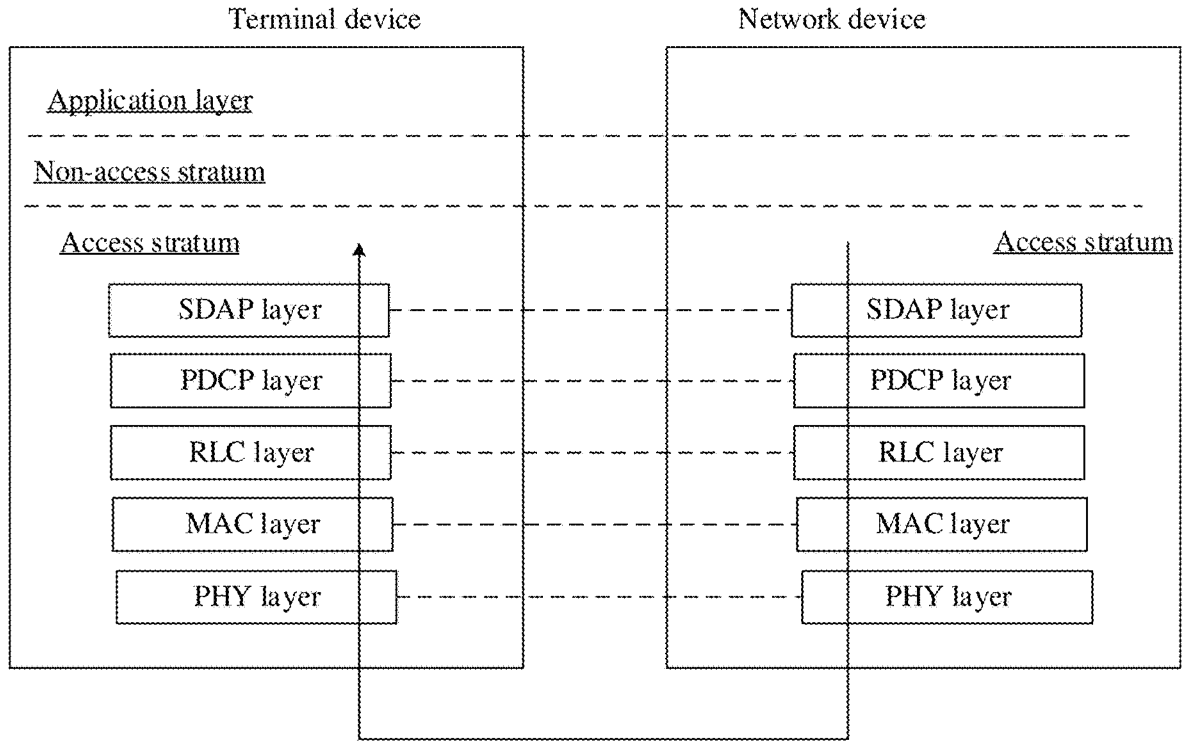
FIG. 2*a*, FIG. 2*b*, FIG. 2*c*, and FIG. 2*d* each are a schematic diagram of a protocol stack according to an embodiment of this application.

The user plane protocol stack is used as an example. The SDAP layer is used to map, to a radio bearer (RB) for transmission, data transmitted on a quality of service flow (QoS flow). The PDCP layer is used to perform user plane security protection, for example, encryption protection and/or integrity protection. The RLC layer is responsible for error correction and flow control. The MAC layer is responsible for controlling and connecting a physical medium at the physical layer. For example, when sending a data packet, the MAC layer may determine in advance whether the data packet can be sent. If the data packet can be sent, some control information is added to the data packet, and finally, the data packet and the control information are sent to the PHY layer in a specified format. The PHY layer is used to provide a service for a bit or a bit group transmitted between the UE and the base station. Data transmission between the network device and the terminal device is used as an example. Data transmission needs to pass through the user plane protocol stack, for example, through the SDAP layer, the PDCP layer, the RLC layer, the MAC layer, and the physical layer. The SDAP layer, the PDCP layer, the RLC layer, the MAC layer, and the physical layer may also be collectively referred to as an access stratum. Because a data transmission direction includes sending or receiving, each of the foregoing layers is further divided into a sending part and a receiving part. Downlink data transmission is used as an example. FIG. 2*a* is a schematic diagram of downlink data transmission between layers. In FIG. 2*a*, a downward arrow represents data sending, and an upward arrow represents data receiving. After obtaining data from an upper layer, a PDCP layer transmits the data to an RLC layer and a MAC layer. The MAC layer generates a transport block and then performs wireless transmission through a physical layer. The data is correspondingly encapsulated at each layer. For example, data received by a layer from an upper layer of the layer is considered as a service data unit (SDU) of the layer, is encapsulated into a protocol data unit (PDU) by the layer, and then is transmitted to a next layer.

For example, it may be further learned from FIG. 2*a* that a terminal device may further have an application layer and a non-access stratum. The application layer may be used to provide a service for an application program installed in the terminal device. For example, downlink data received by the terminal device may be sequentially transmitted from the physical layer to the application layer, and then provided by the application layer for the application program. For another example, the application layer may obtain data generated by the application program, and sequentially transmit the data to the physical layer to send the data to another communication apparatus. The non-access stratum may be used to forward user data. For example, the non-access stratum forwards, to an SDAP layer, uplink data received from the application layer, or forwards, to the application layer, downlink data received from the SDAP layer.

(2) Central Unit (CU) and Distributed Unit (DU)

Figure 2B:
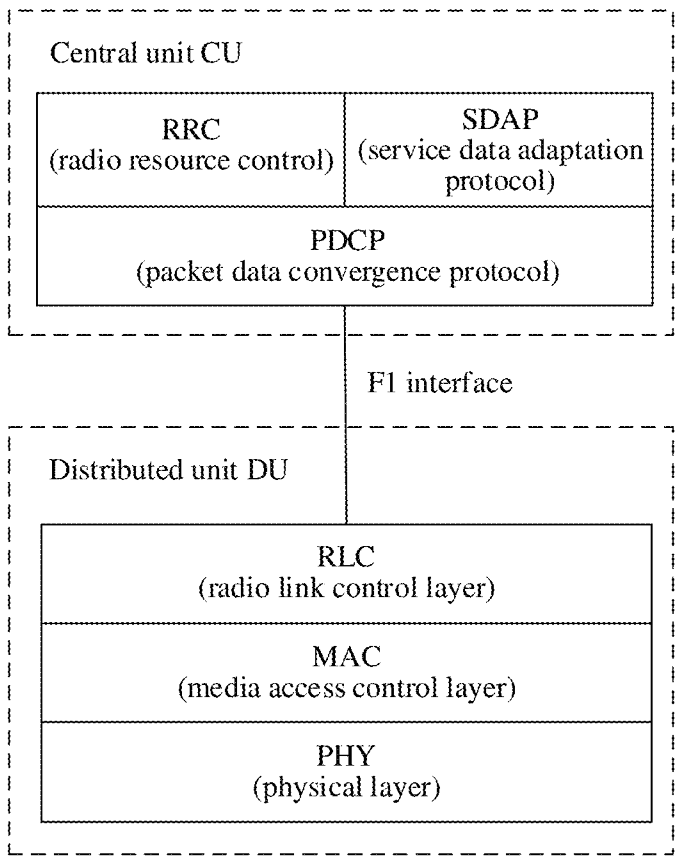
Figure 2C:
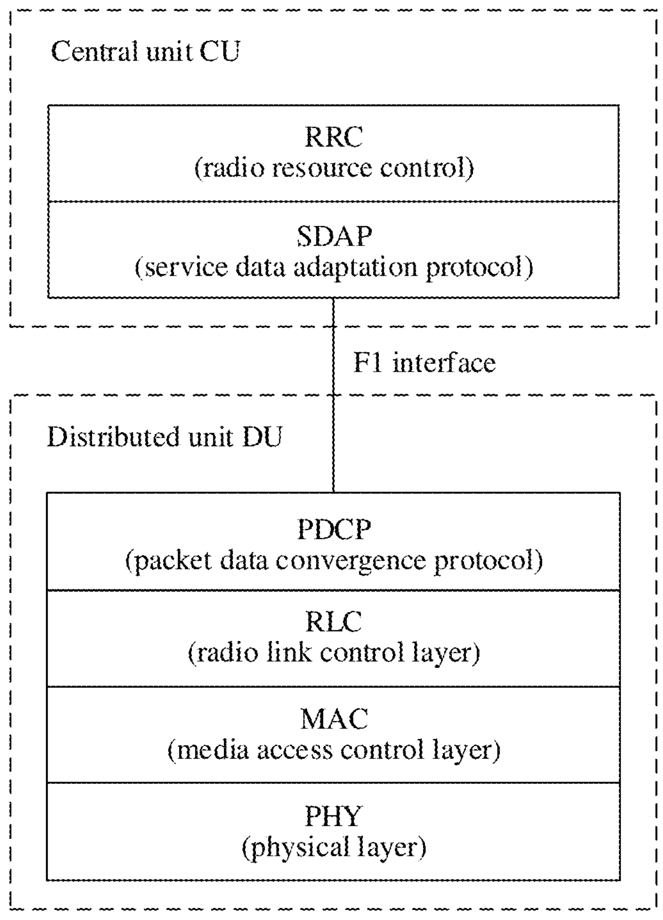

In embodiments of this application, the RAN device may include the CU and the DU. A plurality of DUs may be centrally controlled by one CU. In an example, an interface between the CU and the DU may be referred to as an F1 interface. A control plane (CP) interface may be F1-C, and a user plane (UP) interface may be F1-U. The CU and the DU may be divided based on protocol stacks of a wireless network. For example, as shown in FIG. 2*b*, functions of protocol stacks of a PDCP layer and a layer above the PDCP layer are set on the CU, and functions of protocol stacks of layers below the PDCP layer (for example, an RLC layer and a MAC layer) are set on the DU. For another example, as shown in FIG. 2*c*, functions of a protocol stack of a layer above a PDCP layer are set on the CU, and functions of protocol stacks of the PDCP layer and a layer below the PDCP layer are set on the DU.

It may be understood that division of processing functions of the CU and the DU based on the protocol stacks is merely an example, and the CU and the DU may alternatively be divided in another manner. For example, the CU or the DU may be divided into having functions of more protocol stacks. For another example, the CU or the DU may be further divided into having some processing functions of the protocol stack. In a design, some functions of the RLC layer and functions of a protocol stack of a layer above the RLC layer are set on the CU, and remaining functions of the RLC layer and functions of a protocol stack of a layer below the RLC layer are set on the DU. In another design, division of functions of the CU or the DU may alternatively be performed based on service types or other system requirements. For example, the division may be performed based on latencies. Functions whose processing time needs to meet a latency requirement are set on the DU, and functions whose processing time does not need to meet the latency requirement are set on the CU. In another design, the CU may alternatively have one or more functions of a core network. For example, the CU may be disposed on a network side to facilitate centralized management. In another design, a radio unit (RU) of the DU is disposed remotely. The RU has a radio frequency function.

Optionally, the DU and the RU may be divided at a physical layer (PHY). For example, the DU may implement higher-layer functions of the PHY layer, and the RU may implement lower-layer functions of the PHY layer. When the PHY layer is used for sending, functions of the physical layer may include cyclic redundancy check (CRC) code adding, channel coding, rate matching, scrambling, modulation, layer mapping, precoding, resource mapping, physical antenna mapping, and/or radio frequency sending. When the PHY layer is used for receiving, the functions of the PHY layer may include CRC, channel decoding, rate dematching, descrambling, demodulation, layer demapping, channel detection, resource demapping, physical antenna demapping, and/or radio frequency receiving. The higher-layer functions of the PHY layer may include some functions of the PHY layer. For example, the some functions are closer to the MAC layer. The lower-layer functions of the PHY layer may include the other functions of the PHY layer. For example, the other functions are closer to a radio frequency function. For example, the higher-layer functions of the PHY layer may include CRC code adding, channel coding, rate matching, scrambling, modulation, and layer mapping, and the lower-layer functions of the PHY layer may include precoding, resource mapping, physical antenna mapping, and radio frequency sending; or the higher-layer functions of the PHY layer may include CRC code adding, channel coding, rate matching, scrambling, modulation, layer mapping, and precoding, and the lower-layer functions of the PHY layer may include resource mapping, physical antenna mapping, and radio frequency sending.

Figure 2D:
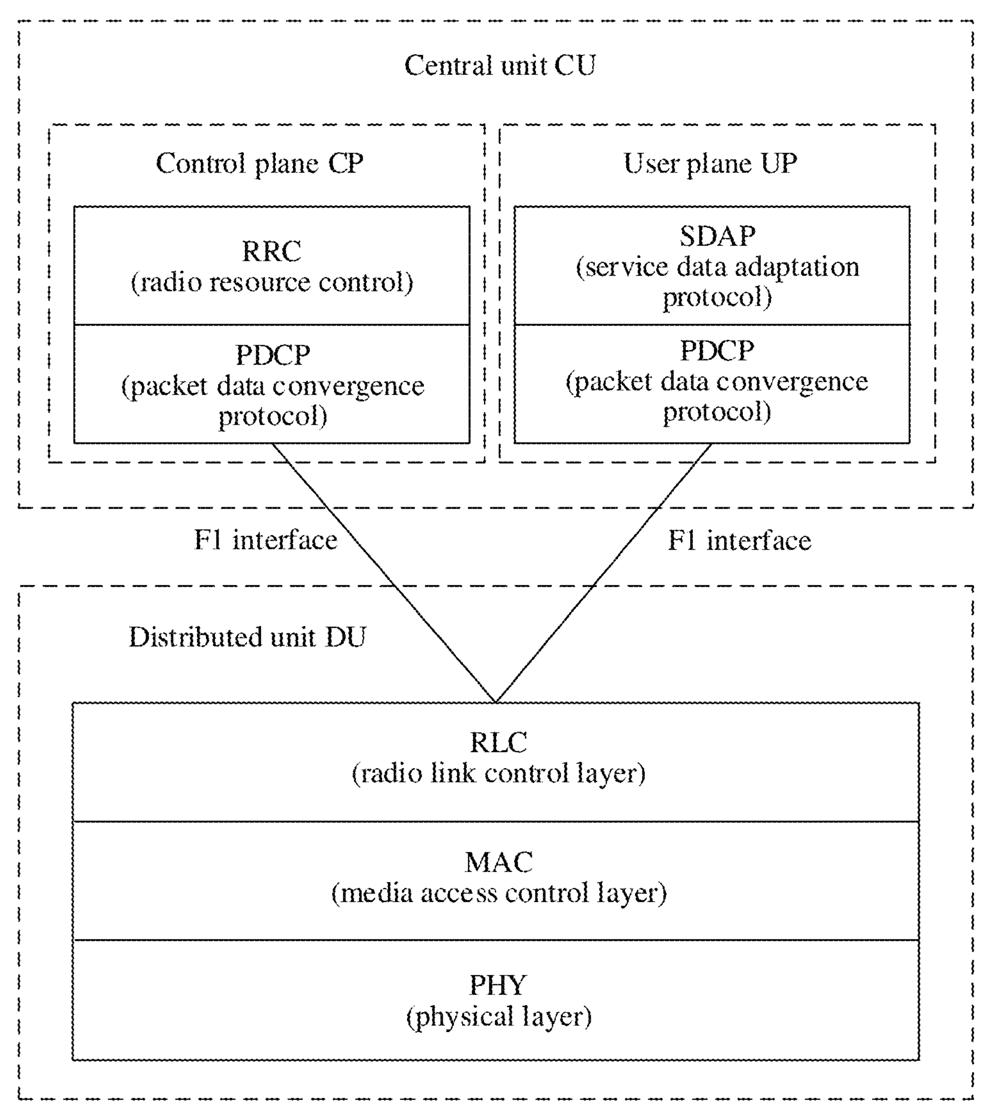

For example, the functions of the CU may be implemented by one entity, or may be implemented by different entities. For example, as shown in FIG. 2*d*, the functions of the CU may be further divided. In other words, a control plane and a user plane are separated, and the separation is implemented through different entities, which are respectively a control plane CU entity (namely, a CU-CP entity) and a user plane CU entity (namely, a CU-UP entity). The CU-CP entity and the CU-UP entity may be coupled to the DU, to jointly complete functions of the RAN device.

It should be noted that in the architectures shown in FIG. 2*b* to FIG. 2*d*, signaling generated by the CU may be sent to the terminal device through the DU, or signaling generated by the terminal device may be sent to the CU through the DU. For example, signaling at the RRC layer or the PDCP layer is finally processed as signaling at the physical layer and sent to the terminal device, or is converted from signaling received from the physical layer. In this architecture, the signaling at the RRC layer or the PDCP layer may be considered to be sent through the DU, or sent through the DU and the RU.

Optionally, any one of the DU, the CU, the CU-CP, the CU-UP, and the RU may be a software module, a hardware structure, or a combination of the software module and the hardware structure. This is not limited. Different entities may exist in different forms. This is not limited. For example, the DU, the CU, the CU-CP, and the CU-UP are software modules, and the RU is a hardware structure. These modules and methods performed by the modules also fall within the protection scope of embodiments of this application.

3. CN

The CN may include one or more CN devices, for example, a CN device 120. A 5th generation (5G) communication system is used as an example. The CN may include an access and mobility management function (AMF) network element, a session management function (SMF) network element, a user plane function (UPF) network element, a policy control function (PCF) network element, a unified data management (UDM) network element, an application function (AF) network element, and the like.

In embodiments of this application, an apparatus configured to implement a function of a core network device may be a core network device, or may be an apparatus that can support the core network device in implementing the function, for example, a chip system, a hardware circuit, a software module, or a combination of the hardware circuit and the software module. The apparatus may be installed in the core network device or may be used together with the core network device. In the technical solutions provided in embodiments of this application, an example in which the apparatus configured to implement the function of the core network device is a core network device is used to describe the technical solutions provided in embodiments of this application.

It should be understood that a quantity of devices in a communication system shown in FIG. 1 is merely used as an example. Embodiments of this application is not limited thereto. During actual application, the communication system may further include more terminal devices and more RAN devices, and may further include another device.

The network architecture shown in FIG. 1 is applicable to communication systems of various radio access technologies (RATs), for example, a 4G (or referred to as LTE) communication system, a 5G (or referred to as new radio (NR)) communication system, or a transition system between the LTE communication system and the 5G communication system. The transition system may also be referred to as a 4.5G communication system, or certainly may be a future communication system such as a 6G communication system. The network architectures and service scenarios described in embodiments of this application are intended to describe the technical solutions in embodiments of this application more clearly, and do not constitute a limitation on the technical solutions provided in embodiments of this application. A person of ordinary skill in the art may know that, with evolution of the communication network architectures and emergence of new service scenarios, the technical solutions provided in embodiments of this application are also applicable to similar technical problems.

In a wireless communication system, a concept of multi-connectivity is introduced. The multi-connectivity may mean that UE keeps being connected to a plurality of base stations, where this "connection" may also be referred to as a "link". Among the plurality of base stations to which the UE keeps being connected, there are a master node (MN) and a secondary node (SN). Optionally, a function of the master node may be more powerful than a function of the secondary node. In a possible design, the UE may first keep being connected to the master node. When a specific condition is met, for example, a throughput of the UE increases, the UE may then establish a connection to the secondary node. A cell group through which the master node provides an air interface resource for the UE may be referred to as a master cell group (MCG), and a cell group in which the secondary node provides an air interface resource for the UE may be referred to as a secondary cell group (SCG). The master cell group and the secondary cell group are described as follows: The master cell group and the secondary cell group may each include at least one cell. For example, the master cell group may include a primary cell (PCell). When carrier aggregation (CA) is configured, the master cell group may further include at least one secondary cell (SCell). The secondary cell group may include a primary secondary cell (PSCell). When the CA is configured, the secondary cell group may further include at least one secondary cell.

The primary cell may be a cell through which the UE establishes an initial connection, the primary cell may be a cell through which the UE reestablishes an RRC connection, the primary cell may be a primary cell specified by the UE in a handover process, or the like. The primary cell is mainly configured to perform RRC communication with the UE. A function of the primary secondary cell is similar to a function of the primary cell. Details are not described again. The secondary cell may be a cell that does not perform RRC communication with the UE, and is mainly configured to provide an additional radio resource. The secondary cell may be added during RRC reconfiguration.

It should be noted that in the descriptions of embodiments of this application, that a cell group includes at least one cell may also be referred to as that the cell group is associated with the at least one cell. For example, a cell associated with the master cell group includes at least the primary cell, and may further include the secondary cell. A cell associated with the secondary cell group includes at least the primary secondary cell, and may further include the secondary cell and the like. One cell may be further associated with at least one carrier. For example, in a supplementary uplink (SUL) scenario, one cell may be associated with two uplink carriers, to resolve a problem of insufficient uplink coverage. In the descriptions of embodiments of this application, a cell may be replaced with a carrier associated with the cell. For example, activating or deactivating a cell may be understood as activating or deactivating at least one "carrier" associated with the cell. For ease of description, the "cell" is used as an example for description in the descriptions of embodiments of this application.

In embodiments of this application, dual connectivity (DC) and triple connectivity are used as examples to describe the multi-connectivity.

1. Dual Connectivity

UE simultaneously keeps being connected to two base stations, and receives services. This is referred to as a dual connectivity structure. A dual connectivity architecture supported in an NR system is also referred to as multi-radio dual connectivity (MR-DC), and includes: dual connectivity formed by an LTE base station and an NR base station, dual connectivity formed by an NR base station and an NR base station, or the like.

A core network is an evolved packet core network (EPC), namely, a 4G core network.

Figure 3:
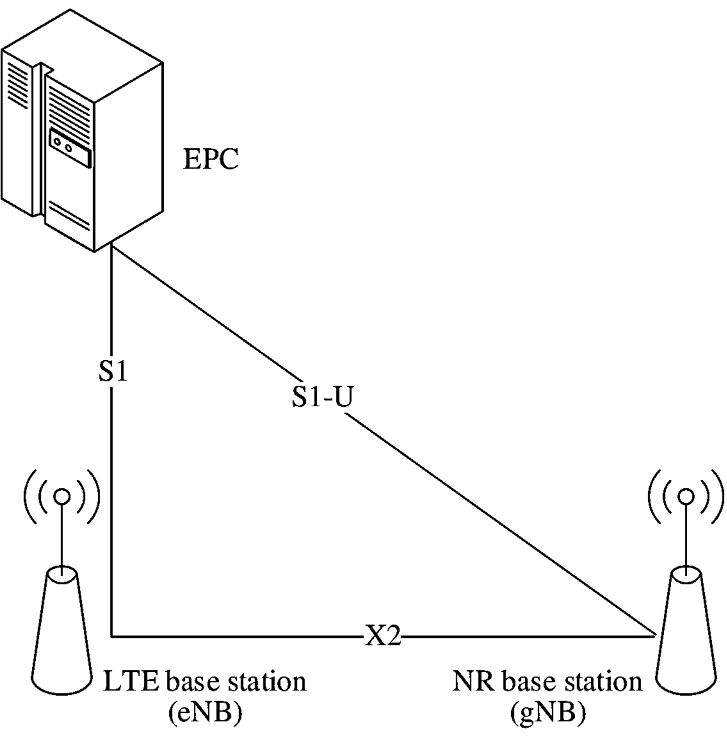
FIG. 3 is a schematic diagram of dual connectivity when a core network is an EPC.

In a design, as shown in FIG. 3, an LTE base station (for example, an eNB) is used as a master node, and an NR base station (for example, a gNB) is used as a secondary node. An X2 interface exists between the LTE base station and the NR base station, at least a control plane connection is included, and a user plane connection may be further included. As the master node, an S1 interface exists between the LTE base station and the EPC, at least a control plane connection is included, and a user plane connection may be further included. As the master node, the LTE base station may provide an air interface resource for the UE through at least one LTE cell, where the at least one LTE cell is referred to as a master cell group. As the secondary node, an S1-U interface exists between the NR base station and the EPC, and only a user plane connection is included. As the secondary node, the NR base station may provide an air interface resource for the UE through at least one NR cell, where the at least one NR cell is referred to as a secondary cell group.

The core network is a 5th generation core network (5GC), namely, a 5G core network.

Figure 4A:
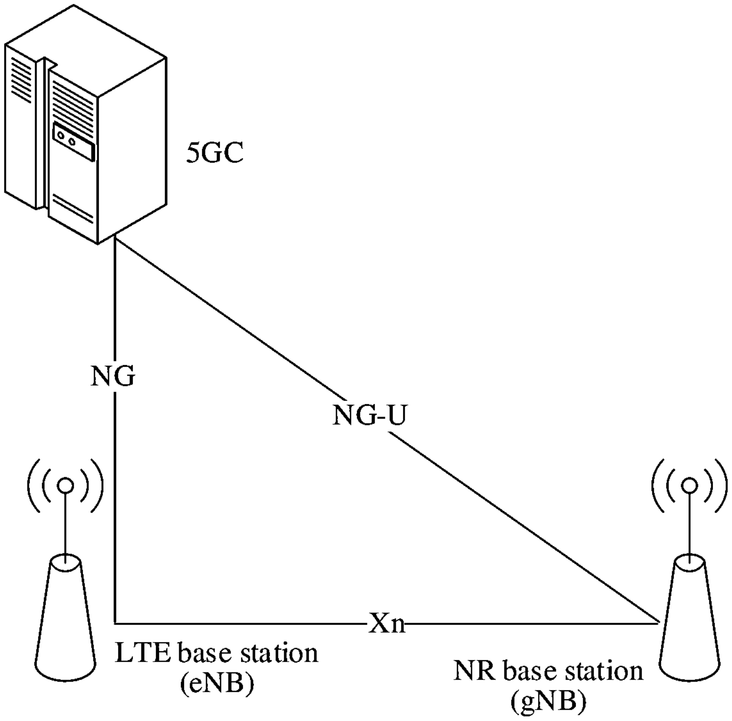
FIG. 4*a*, FIG. 4*b*, and FIG. 4*c* each are a schematic diagram of dual connectivity when a core network is a 5G core network.

In a design, as shown in FIG. 4*a*, an LTE base station is used as a master node, and an NR base station is used as a secondary node. An Xn interface exists between the LTE base station and the NR base station, at least a control plane connection is included, and a user plane connection may be further included. As the master node, an NG interface exists between the LTE base station and the 5GC, at least a control plane connection is included, and a user plane connection may be further included. As the master node, the LTE base station may provide an air interface resource for the UE through at least one LTE cell, where the at least one LTE cell is referred to as a master cell group. As the secondary node, an NG-U interface exists between the NR base station and the 5GC, and only a user plane connection is included. As the secondary node, the NR base station may provide an air interface resource for the UE through at least one NR cell, where the at least one NR cell is referred to as a secondary cell group.

Figure 4B:
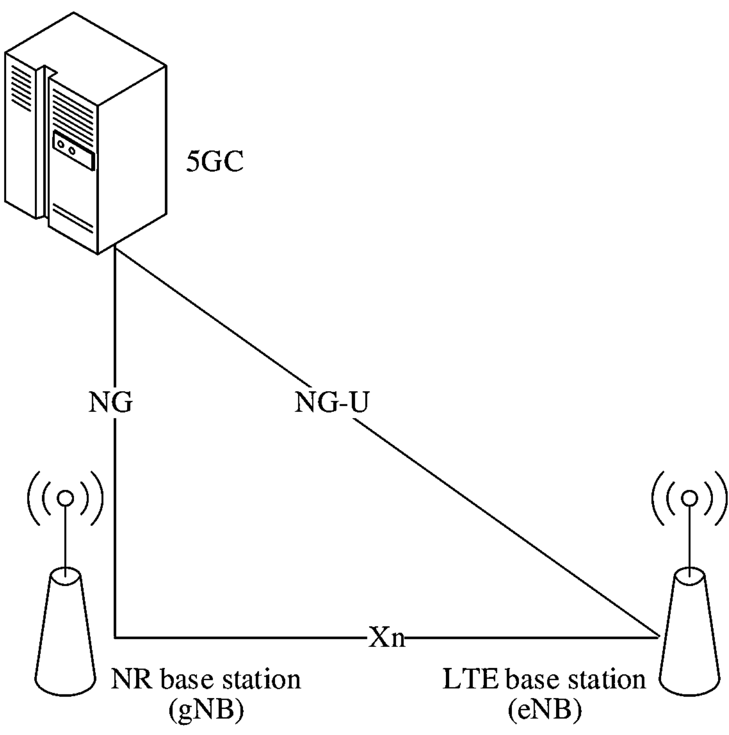

In another design, as shown in FIG. 4*b*, an NR base station is used as a master node, and an LTE base station is used as a secondary node. An Xn interface exists between the NR base station and the LTE base station, at least a control plane connection is included, and a user plane connection may be further included. As the master node, an NG interface exists between the NR base station and the 5GC, at least a control plane connection is included, and a user plane connection may be further included. As the master node, the NR base station may provide an air interface resource for the UE through at least one NR cell, where the at least one NR cell is referred to as a master cell group. As the secondary node, an NG-U interface exists between the LTE base station and the 5GC, and only a user plane connection is included. As the secondary node, the LTE base station may provide an air interface resource for the UE through at least one LTE cell, where the at least one LTE cell is referred to as a secondary cell group.

Figure 4C:
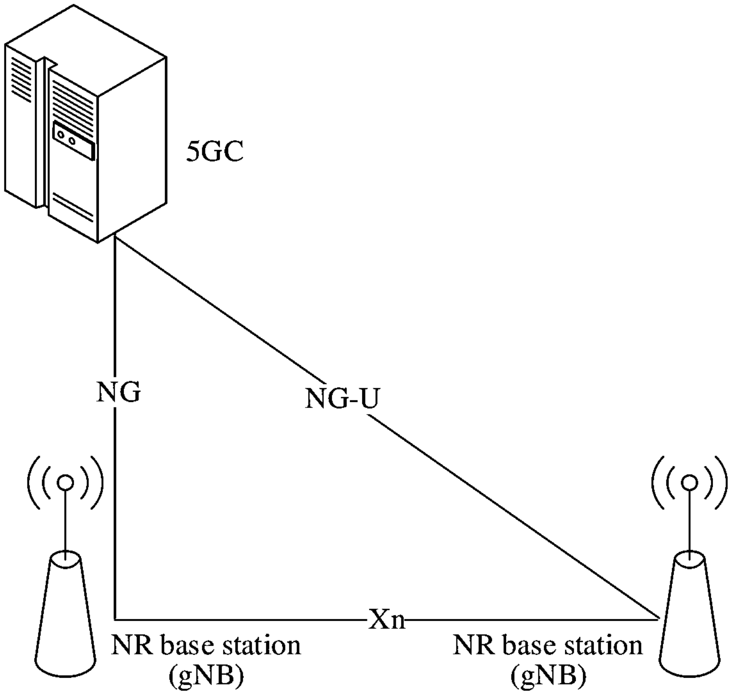

In another design, as shown in FIG. 4*c*, both a master node and a secondary node are NR base stations. An interface between the master node and the secondary node is an Xn interface, at least a control plane connection is included, and a user plane connection may be further included. An NG interface exists between the NR master base station and the 5GC, at least a control plane connection is included, and a user plane connection may be further included. The NR master base station may provide an air interface resource for the UE through at least one NR cell, where the at least one NR cell is referred to as a master cell group. An NG-U interface exists between the NR secondary base station and the 5GC, and only a user plane connection is included. The NR secondary base station may also provide an air interface resource for the UE through at least one NR cell, where the at least one NR cell is referred to as a secondary cell group.

2. Triple Connectivity

A frequency band with a higher frequency and a service with a higher throughput requirement are introduced in NR. Therefore, to cope with convergence and coverage of different frequencies such as limited coverage of a frequency band with a high frequency, and more flexibly use spectrum resources of different frequency bands to improve throughput performance and the like, the triple connectivity is introduced on the basis of dual connectivity. UE simultaneously keeps being connected to three base stations, and receives services. This is referred to as a triple connectivity structure. In a design, the three base stations that simultaneously keep being connected to the UE are respectively referred to as a master node, a secondary node 1, and a secondary node 2. A cell group through which the master node provides resource coverage is referred to as a master cell group, and cell groups through which the two secondary nodes provide resource coverage are respectively referred to as a secondary cell group 1 and a secondary cell group 2.

Figure 5A:
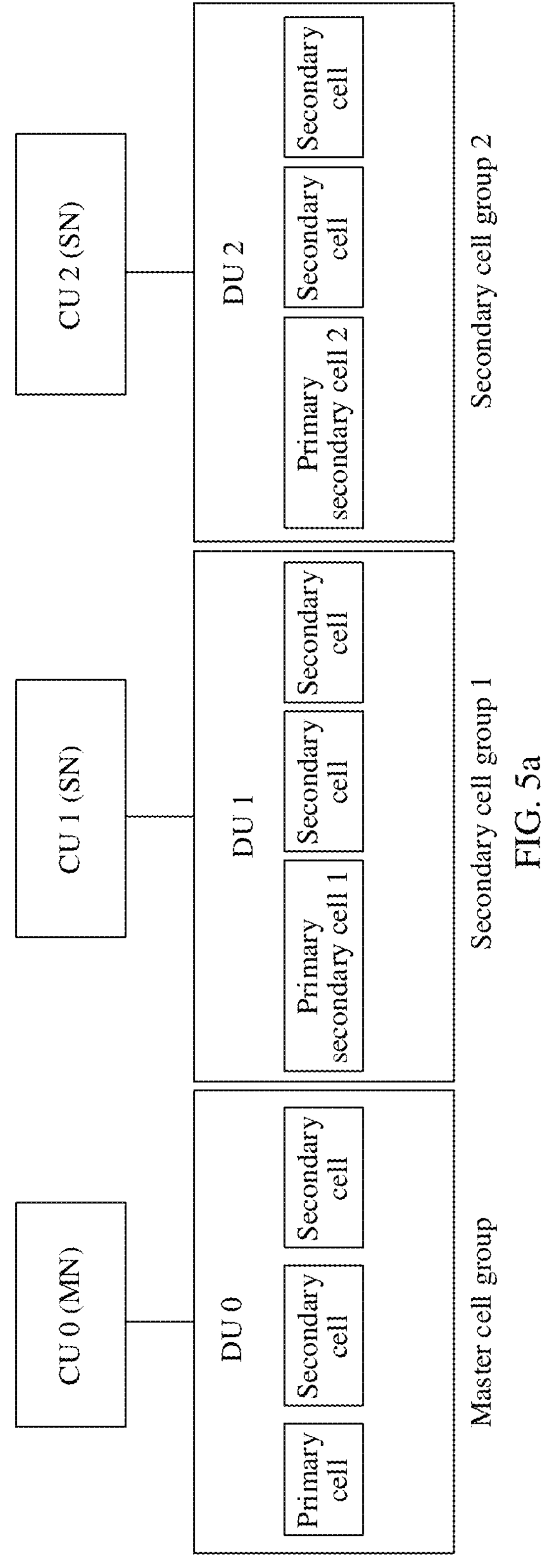
FIG. 5*a* and FIG. 5*b* each are a schematic diagram of triple connectivity.

For example, as shown in FIG. 5*a*, the master node includes a CU 0 and a DU 0. Cells through which the DU 0 of the master node provides an air interface resource for the UE are referred to as a primary cell and a secondary cell. That is, the master cell group includes the primary cell and the secondary cell. The secondary node 1 includes a CU 1 and a DU 1. Cells through which the DU 1 of the secondary node 1 provides air interface resource coverage for the UE include a primary secondary cell 1 and a secondary cell. That is, the secondary cell group 1 includes the primary secondary cell 1 and the secondary cell. The secondary node 2 includes a CU 2 and a DU 2. Cells through which the DU 2 of the secondary node 2 provides air interface resource coverage for the UE include a primary secondary cell 2 and a secondary cell. That is, the secondary cell group 2 includes the primary secondary cell 2 and the secondary cell.

Figure 5B:
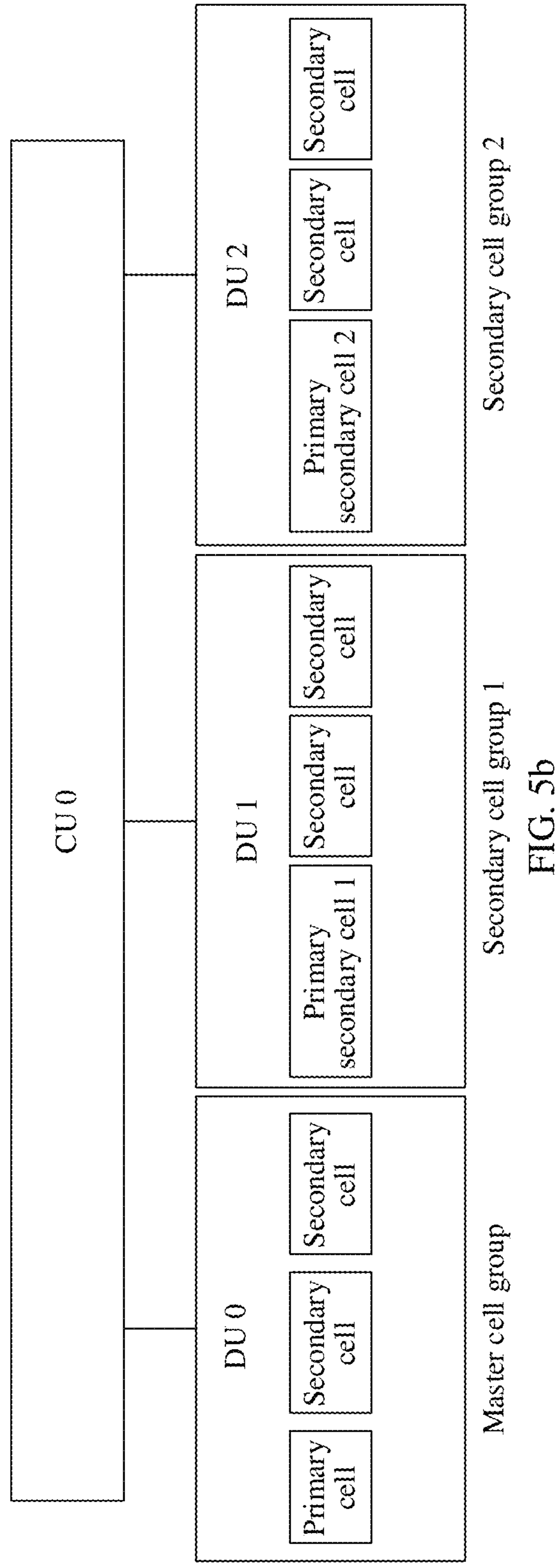

Alternatively, as shown in FIG. 5*b*, the master node and a plurality of secondary nodes may share a same CU. The master node includes a CU 0 and a DU 0. Cells through which the DU 0 of the master node provides an air interface resource for the UE are referred to as a primary cell and a secondary cell. That is, the master cell group includes the primary cell and the secondary cell. The secondary node 1 includes the CU 0 and a DU 1. Cells through which the DU 1 of the secondary node 1 provides air interface resource coverage for the UE include a primary secondary cell 1 and a secondary cell. That is, the secondary cell group 1 includes the primary secondary cell 1 and the secondary cell. The secondary node 2 includes the CU 0 and a DU 2. Cells through the DU 2 of the secondary node 2 provide air interface resource coverage for the UE include a primary secondary cell 2 and a secondary cell. That is, the secondary cell group 2 includes the primary secondary cell 2 and the secondary cell. In FIG. 5*a* and FIG. 5*b*, an example in which the master cell group includes two secondary cells, and the secondary cell group 1 and the secondary cell group 2 each include two secondary cells is used for description.

In a design, if a data rate requirement of the UE is changed, for example, the rate requirement is changed from a high rate to a low rate, or power consumption of the UE is high, a base station may deactivate a secondary cell group that has been configured for the UE, so that the UE temporarily disconnects a communication link with the secondary cell group, and maintains data communication through the master cell group. Once the data rate requirement of the UE is changed from a low rate to a high rate, or power consumption of the UE is reduced, the base station may reactivate the secondary cell group that has been in a deactivated state, and resume the communication link between the UE and the secondary cell group. For example, the base station may deliver, to the UE, signaling for deactivating or activating the secondary cell group. After receiving the signaling, the UE performs an operation of deactivating or activating the secondary cell group.

According to the foregoing design, flexibility of activating or deactivating a cell group is poor, and a requirement of the triple connectivity architecture cannot be met. For example, in the triple connectivity architecture, because coverage ranges of different frequencies are different, there may be a case in which a link status of a master cell group is poor, and a link status of a secondary cell group is good. Therefore, there is a requirement for activating or deactivating the master cell group. However, according to the foregoing design, only the secondary cell group can be activated or deactivated, and the requirement for activating and/or deactivating the master cell group cannot be met. Alternatively, a requirement that cell groups activated by the UE are changed from "the master cell group and the secondary cell group 1" to "the master cell group and the secondary cell group 2" cannot be met. In the foregoing design, only one cell group may be activated or deactivated each time. Therefore, according to the foregoing design, the "secondary cell group 1" may be deactivated first, and then the "secondary cell group 2" is activated. Therefore, flexibility is poor.

Embodiments of this application provide a communication method. The communication method may be used to flexibly and dynamically activate and/or deactivate a cell group of UE, and includes: The UE receives a first message from a base station, where the first message is used to activate and/or deactivate at least one of a plurality of cell groups of the UE, the plurality of cell groups include a master cell group and a secondary cell group, and there is at least one secondary cell group. The UE activates and/or deactivates the at least one cell group based on the first message. According to the method in embodiments of this application, the cell group of the UE may be flexibly activated and/or deactivated. It should be noted that the solutions in embodiments of this application are applicable to any multi-connectivity architecture. The multi-connectivity architecture may be a dual connectivity architecture, a triple connectivity architecture, even a future quadruple connectivity architecture or quintuple connectivity architecture, or the like. This is not limited.

It may be understood that in embodiments of this application, the UE or the base station may perform some or all of the steps in embodiments of this application. These steps or operations are merely examples. In embodiments of this application, other operations or various variations of the operations may be further performed. In addition, the steps may be performed in a sequence different from a sequence presented in embodiments of this application, and not all the operations in embodiments of this application may be performed.

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

Embodiment 1

Figures 6, 7, 8, 9, 10:
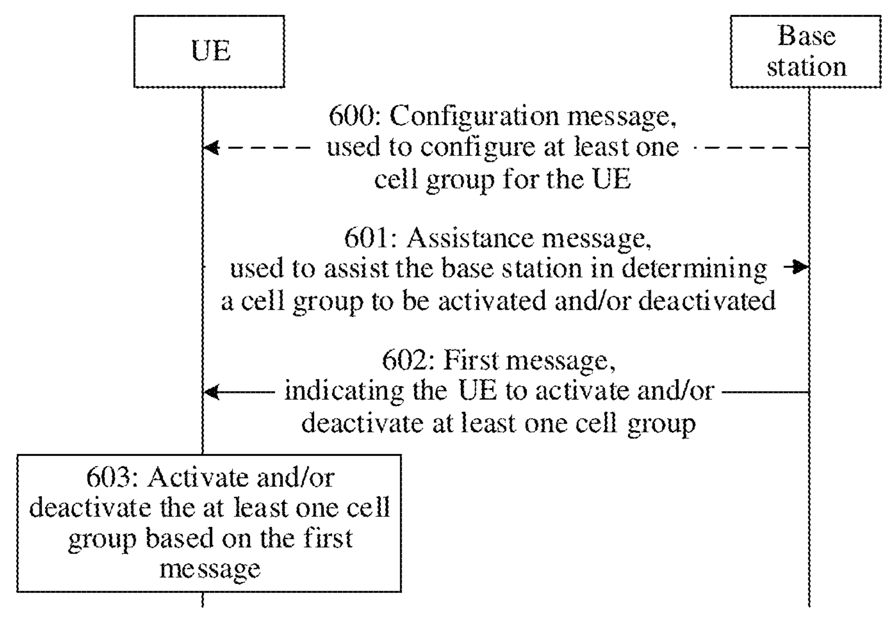
FIG. 6 is a flowchart of a communication method according to Embodiment 1 of this application.
FIG. 7 to FIG. 12 each are a schematic diagram of a format of a first message according to an embodiment of this application.

As shown in FIG. 6, a process of a communication method is provided, and includes at least the following steps.

Optionally, step 600: UE receives a configuration message from a base station, where the configuration message is used to configure at least one cell group for the UE. The configuration message may be an air interface message, for example, an RRC message or a MAC message, or may be an RRC reconfiguration message, an RRC establishment message, an RRC resume message, or the like. This is not limited.

For example, the base station that configures the cell group for the UE may be any one of base stations in multi-connectivity with the UE. A triple connectivity architecture is used as an example. The base station that configures the cell group for the UE may be a master node corresponding to a master cell group, a secondary node 1 corresponding to a secondary cell group 1, a secondary node 2 corresponding to a secondary cell group 2, or the like. This is not limited. In a design, the configuration message may be used to configure an identifier of the cell group for the UE, and the identifier of the cell group may be 0, 1, 2, or the like. For example, an identifier of the master cell group may be 0, an identifier of the secondary cell group 1 may be 1, and an identifier of the secondary cell group 2 may be 2.

Optionally, step 601: The UE sends a second message to the base station, where the second message may also be referred to as an assistance message, and the assistance message is used to assist the base station in activating and/or deactivating the at least one cell group of the UE. The assistance message may be an RRC message, a MAC message, or physical layer signaling, for example, DCI. This is not limited. In a design, the assistance message may indicate at least one of the following:

Link status of the at least one cell group of the UE: The link status of the cell group may be represented by using reference signal received power (RSRP), reference signal received quality (RSRQ), or the like. The link status of the at least one cell group may be a cell group-level link status. For example, in an implementation, the UE may receive a downlink reference signal through a cell associated with a cell group, determine a link status of the cell based on the downlink reference signal, and determine a link status of the cell group based on a link status of at least one cell associated with the cell group. The cell associated with the cell group may also be referred to as a cell included in the cell group, or the like. For example, in the foregoing descriptions, cells associated with the master cell group include a primary cell and a secondary cell, and cells associated with the secondary cell group include a primary secondary cell, a secondary cell, and the like. Alternatively, the link status of the at least one cell group may be a cell-level link status. In other words, the UE may report, in the assistance message, a link status of at least one cell associated with the cell group.

Cell group recommended or preferred by the UE to be activated and/or deactivated: In a design, the UE may consider at least one of the link status of the cell group, a power consumption status of the UE, traffic volume information of the UE, or the like, and recommend the base station to activate and/or deactivate at least one cell group. For example, the UE may recommend the base station to activate a cell group with a good link status, or recommend the base station to deactivate a cell group with a poor link status. Alternatively, when needing to reduce power consumption, the UE may recommend deactivating the cell group. Alternatively, when a traffic volume of the UE is small, the UE may recommend deactivating the cell group. Alternatively, when a traffic volume of the UE is large, the UE may recommend activating the cell group.

Case in which there is to-be-sent data in the at least one cell group of the UE, data volume of the to-be-sent data in the at least one cell group of the UE, or the like: In a possible solution, the UE may send the assistance message through an activated cell group, to indicate that there is to-be-sent data in a cell group deactivated by the UE, so that the base station reactivates the cell group.

Step 602: The base station sends a first message to the UE, where the first message may also be referred to as a cell group activation and/or deactivation indication, and the first message indicates the UE to activate and/or deactivate at least one of a plurality of cell groups of the UE. The first message may be an RRC message, a MAC message, physical layer signaling, or the like. This is not limited.

In a design, the base station that sends the first message may be any one of the base stations in multi-connectivity with the UE. The triple connectivity architecture is used as an example. The base station that sends the first message may be a master node, a secondary node 1, a secondary node 2, or the like. That the first message indicates the UE to activate and/or deactivate at least one of a plurality of cell groups of the UE is described as follows: The first message may indicate the UE to activate one or more of the plurality of cell groups of the UE. The triple connectivity architecture is used as an example. The plurality of cell groups of the UE include a master cell group, a secondary cell group 1, and a secondary cell group 2. In this case, the first message may indicate the UE to activate any one or more cell groups of the master cell group, the secondary cell group 1, the secondary cell group 2, or the like. Alternatively, the first message may indicate the UE to deactivate any one or more of the plurality of cell groups of the UE. For example, the first message may indicate the UE to deactivate one or more cell groups of the master cell group, the secondary cell group 1, the secondary cell group 2, or the like. Alternatively, the first message may simultaneously indicate the UE to activate any one or more of the plurality of cell groups and deactivate any one or more cell groups. For example, the first message may indicate the UE to deactivate the secondary cell group 1, and indicate the UE to activate the secondary cell group 2. In this case, the cell groups activated by the UE may be changed from the master cell group and the secondary cell group 1 to the master cell group and the secondary cell group 2.

In another design, for at least one RB, the RB may be a signaling radio bearer (SRB), a data radio bearer (DRB), or the like. A plurality of RLC entities may be established, and each cell group may be associated with one or more RLC entities. For example, an RLC entity associated with the master cell group includes an RLC entity A, an RLC entity B, an RLC entity C, or the like. The RLC entities may be configured to transmit same data, to implement a PDCP duplication function, and further improve transmission reliability; or the RLC entities may transmit different data, to ensure that different RLC entities transmit different data, and implement differentiated processing. For example, some data is transmitted through a specific RLC entity, to improve transmission reliability. Activating or deactivating a cell group may be activating or deactivating at least one RLC entity associated with the cell group. For example, activating or deactivating the master cell group may be activating or deactivating at least one of the RLC entity A, the RLC entity B, the RLC entity C, or the like associated with the master cell group. For ease of description, in the following descriptions of this embodiment of this application, an example in which each cell group is associated with one RLC entity is used for description.

The triple connectivity architecture is used as an example. For each RB, three RLC entities may be established, and indexes are sequentially 0 to 2. An RLC entity 0 may be associated with the master cell group, an RLC entity 1 may be associated with the secondary cell group 1, and an RLC entity 2 may be associated with the secondary cell group 2. In the descriptions of this embodiment of this application, activating or deactivating at least one cell group may include activating or deactivating an RLC entity associated with the at least one cell group. For example, deactivating the secondary cell group 1 is deactivating the RLC entity 1. Alternatively, deactivating the master cell group is deactivating the RLC entity 0. Optionally, activating or deactivating the RLC entity may include: A PDCP entity does not deliver an uplink data packet to the RLC entity. Optionally, the activating or deactivating the RLC entity may further include: The RLC entity does not deliver a downlink data packet to the PDCP entity. Optionally, activating or deactivating the RLC entity may include: The RLC entity does not deliver an uplink data packet to a MAC entity corresponding to the RLC entity. The activating or deactivating the RLC entity may further include: The MAC entity does not deliver a downlink data packet to the RLC entity.

It should be noted that in the descriptions of this application, activate may be understood as "resume", and deactivate may be understood as "suspend". For example, when the master cell group or the secondary cell group is deactivated or suspended, it may be considered that the UE temporarily interrupts a communication link of the master cell group or the secondary cell group. The deactivated or suspended master cell group or secondary cell group may further be "resumed", in other words, the master cell group or the secondary cell group restarts data transmission. Alternatively, in some other descriptions, activation or deactivation of a cell group may alternatively be understood as a "change" of the cell group through which the UE performs data transmission. For example, the cell group configured for the UE includes the secondary cell group 1 and the secondary cell group 2. When the secondary cell group 1 is in an "activated" state, the secondary cell group 1 maintains data communication with the UE. When the secondary cell group 1 is "deactivated" and the secondary cell group 2 is activated, a secondary cell group that maintains a communication link for UE communication is changed from "the secondary cell group 1" to "the secondary cell group 2".

In the descriptions of this embodiment of this application, the activated state may be understood as "active", "valid", "available", or the like. A deactivated state may be understood as "inactive", "invalid", "unavailable", or the like.

In this embodiment of this application, the first message may include at least one of the following formats:

Format 1: The base station indicates, in a form of a bitmap, a cell group to be activated and/or deactivated by the UE. When a value of a bit corresponding to the cell group is a first value (for example, 1), it indicates to activate the cell group. When a value of a bit corresponding to the cell group is a second value (for example, 0), it indicates to deactivate the cell group. Triple connectivity is used as an example. In a design, as shown in FIG. 7, R represents a reserved field, and indexes corresponding to the master cell group, the secondary cell group 1, and the secondary cell group 2 are sequentially a cell group (CG) 1, a cell group 2, and a cell group 3. Bits of the cell group 1, the cell group 2, and the cell group 3 each represent an activated state or a deactivated state of the corresponding cell group. For example, when a value of the bit corresponding to the cell group 1 is "1", it indicates to activate the cell group 1. When a value of the bit corresponding to the cell group 1 is "0", it indicates to deactivate the cell group 1.

Format 2: A cell group to be activated or deactivated is indicated by carrying a cell group identifier. In the format 2, only the cell group identifier is indicated. Specifically, activating or deactivating the cell group corresponding to the cell group identifier may be predefined, specified in a protocol, indicated by using another message or another field in the first message, or the like. This is not limited. Triple connectivity is used as an example. In a design, as shown in FIG. 8, R represents a reserved field, and a cell group identifier (namely, a CG identifier) field indicates at least one cell group identifier. For example, when the cell group identifier field indicates a cell group 1, the UE may perform an activation or deactivation operation on the cell group 1. It should be noted that in FIG. 8, there may be a plurality of cell group identifier fields, which respectively indicate a plurality of cell groups; or one cell group identifier field in FIG. 8 may indicate one or more cell group identifiers. This is not limited.

Format 3: A cell group to be activated or deactivated is indicated by carrying a code point of a cell group identifier. In the format 3, at least one of the plurality of cell groups configured for the UE may be indicated by a code point, and specific activation or deactivation of the cell group indicated by the code point may be determined based on an initially configured activated state. For example, eight cell groups are configured for the UE in advance, and four of the eight cell groups are configured to be in an initial activated state. In this case, the code point may indicate to deactivate at least one cell group of the four cell groups. For example, the four cell groups are coded from 0 to 3 in sequence. When a code indicated by the code point is 3, it indicates to deactivate the 3$^{rd}$ cell group in the four cell groups. In a design, two code point fields are used as an example. As shown in FIG. 9, R represents a reserved field, the two code point fields are respectively a T0 field and a T1 field, and each field occupies one bit. In this case, the T0 field and the T1 field may indicate a maximum of three cell groups. For example, eight cell groups are configured for the UE, and identifiers of the eight cell groups are sequentially 0 to 7. When the eight cell groups are configured, it indicates that an initial state of the cell group 0, the cell group 1, the cell group 4, and the cell group 6 is an activated state. In this case, values of the T0 field and the T1 field may be "ordinals" of the identifiers of the four activated cell groups. When the values of the T0 field and the T1 field are respectively 0 and 1 in binary, a corresponding decimal value is "1", and it indicates to deactivate the 1$^{st}$ cell group in the four cell groups, that is, deactivate the cell group 0. Alternatively, when the values of the T0 field and the T1 field are respectively 1 and 0 in binary, a corresponding decimal value is "2", and it indicates to deactivate the 2$^{nd}$ cell group in the four cell groups, that is, deactivate the cell group 1. Alternatively, when the values of the T0 field and the T1 field are 1 and 1 in binary, a corresponding decimal value is "3", and it indicates to deactivate the 3$^{rd}$ cell group in the four cell groups, that is, deactivate the cell group 4. Alternatively, 16 cell groups are configured for the UE, and cell group identifiers are respectively 1 to 16. A medium access control control element (MAC CE) indicates that a maximum of eight cell groups can be activated in the 16 cell groups. For example, a cell group 0, a cell group 1, a cell group 4, a cell group 6, and a cell group 16 are in an activated state. In this case, values of the T0 field and the T1 field may be "ordinals" of the identifiers of the activated cell group. For example, when the values of the T0 field and the T1 field are "1" in decimal, it indicates to deactivate the 1$^{st}$ cell group in the activated cell groups, that is, deactivate the cell group 0. When the values of the T0 field and the T1 field are "2" in decimal, it indicates to deactivate the 2nd cell group in the activated cell groups, that is, deactivate the cell group 1. When the values of the T0 field and the T1 field are "3" in decimal, it indicates to deactivate the 3$^{rd}$ cell group in the activated cell groups, that is, deactivate the cell group 4. Certainly, in the foregoing descriptions, that a cell group is deactivated by using a code point is used as an example. For a cell group that is initially configured to be in a deactivated state, the cell group may also be activated by using the code point.

In a solution, when the UE activates or deactivates at least one cell group of the UE based on the first message, the UE may further activate or deactivate a cell associated with the cell group. In a design, the cell associated with the cell group may be considered as all cells associated with the cell group. To be specific, in addition to activating or deactivating a cell group, the UE may further activate or deactivate all cells associated with the cell group, and all the cells include a primary cell, a primary secondary cell, a secondary cell, or the like. For example, it can be learned from the foregoing descriptions that, in a triple connectivity scenario, the at least one cell group of the UE includes the master cell group, the secondary cell group 1, and the secondary cell group 2. Cells associated with the master cell group include a primary cell and a secondary cell, and cells associated with the secondary cell group 1 or the secondary cell group 2 include a primary secondary cell and a secondary cell. In this embodiment of this application, when the first message is used to activate or deactivate the master cell group, the secondary cell group 1, or the secondary cell group 2, the first message may be further used to activate or deactivate all cells associated with the cell group.

Alternatively, the cell associated with the cell group may be considered as all secondary cells associated with the cell group. The foregoing example is still used. When the first message is used to activate or deactivate the master cell group, the secondary cell group 1, or the secondary cell group 2, the UE further activates or deactivates all the secondary cells associated with the cell group. To be specific, when the first message indicates to activate or deactivate the master cell group, the UE may further activate or deactivate all secondary cells associated with the master cell group. When the first message indicates to activate or deactivate the secondary cell group 1 or the secondary cell group 2, the UE may further activate or deactivate all secondary cells in the secondary cell group 1 or the secondary cell group 2.

Alternatively, the cell associated with the cell group may be considered as the primary cell or the primary secondary cell associated with the cell group. The foregoing example is still used. When the first message is used to activate or deactivate the master cell group, the secondary cell group 1, or the secondary cell group 2, the UE further activates or deactivates the primary cell or the primary secondary cell associated with the cell group. For example, when the first message indicates to activate or deactivate the master cell group, the UE may further activate or deactivate the primary cell associated with the master cell group. Alternatively, when the first message indicates to activate or deactivate the secondary cell group 1 or the secondary cell group 2, the UE may further activate or deactivate the primary secondary cell in the secondary cell group 1 or the secondary cell group 2.

According to the foregoing design, the cell associated with the cell group does not need to be additionally activated or deactivated. This reduces signaling overheads.

In another solution, when the first message indicates to activate at least one cell group, the first message may further indicate to activate or deactivate at least one secondary cell associated with the cell group. For example, when the first message indicates to activate the master cell group, the secondary cell group 1, or the secondary cell group 2, the first message may further indicate to activate or deactivate at least one secondary cell associated with the master cell group, the secondary cell group 1, or the secondary cell group 2. In this solution, the base station only needs to deliver the first message, to simultaneously activate the at least one cell group of the UE and activate or deactivate the secondary cell associated with the cell group, and does not need to additionally send signaling for activating or deactivating the secondary cell. This reduces signaling overheads. In this solution, a format of the first message may include at least one of the following:

Format (1): A form of a bitmap indicates to activate or deactivate a cell group, and the form of the bitmap may further indicate to activate or deactivate a secondary cell associated with the foregoing activated cell group. For how the form of the bitmap indicates to activate or deactivate the cell group, refer to the descriptions of the foregoing format 1. A process of how the form of the bitmap indicates to activate or deactivate the secondary cell associated with the cell group may include: A bit is reserved for all secondary cells associated with the activated cell group, and when a value of the bit is a first value (for example, 1), the secondary cell corresponding to the bit may be activated. When a value of the bit is a second value (for example, 0), the secondary cell corresponding to the bit may be deactivated.

For example, as shown in FIG. 10, R represents a reserved field, and fields of a cell group 1, a cell group 2, and a cell group 3 each represent an activated state or a deactivated state of the corresponding cell group. That the field corresponding to the cell group 1 is 1 and corresponds to the activated state is used as an example. The first message may further indicate an activated state or a deactivated state of seven secondary cells associated with the cell group 1. Indexes of the seven secondary cells may be 1 to 7, and may separately indicate the activated state or the deactivated state of each secondary cell. In FIG. 10, C1 to C7 represent the seven secondary cells. Specifically, if a value of a bit corresponding to Ci is 1, it indicates to activate Ci. If a value of a bit corresponding to Ci is 0, it indicates to deactivate Ci. Ci represents any secondary cell associated with the cell group 1, and a value of i is a positive integer greater than or equal to 1 and less than or equal to 7.

It may be understood that in FIG. 10, an example in which a secondary cell associated with one cell group is activated or deactivated is used for illustration. If there are a plurality of to-be-activated cell groups, an activated state or a deactivated state of secondary cells of activated cell groups may be sequentially indicated in a sequence of activating the cell groups.

Format (2): A cell group to be activated or deactivated is indicated by carrying a cell group identifier, and a form of a bitmap indicates to activate or deactivate at least one secondary cell associated with the activated cell group. For how to indicate, by carrying the cell group identifier, the cell group to be activated or deactivated, refer to the descriptions of the foregoing format 2. For how the form of the bitmap indicates to activate or deactivate the at least one secondary cell associated with the activated cell group, refer to the descriptions of the foregoing format (1) in this solution.

Figures 11, 12, 13, 14:
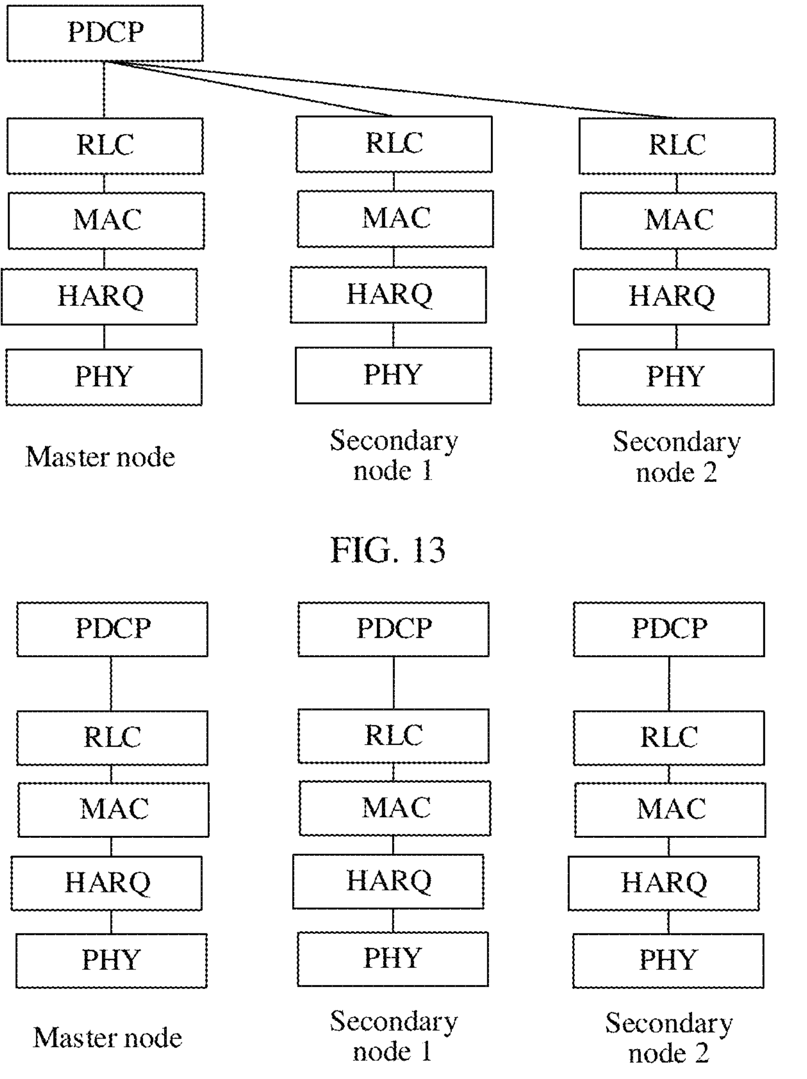
FIG. 13 is a schematic diagram of a protocol stack architecture in which a PDCP anchor is not changed according to an embodiment of this application.
FIG. 14 is a schematic diagram of a protocol stack architecture in which a PDCP anchor is changed according to an embodiment of this application.

In a possible manner, as shown in FIG. 11, R represents a reserved field, and a cell group identifier field indicates an activation or deactivation operation performed on a corresponding cell group. For example, if a cell group identifier is a cell group 1, after receiving the first message, the UE may activate the cell group 1 or deactivate the cell group 1. An example of activating the cell group 1 is used. The first message may further indicate to activate or deactivate seven secondary cells associated with the cell group 1. In FIGS. 11, C1 to C7 also represent the seven secondary cells.

Format (3): A cell group to be activated or deactivated is indicated by carrying a code point of a cell group identifier, and a form of a bitmap indicates to activate or deactivate at least one secondary cell associated with the activated cell group. For how to indicate, by carrying the code point of the cell group identifier, the cell group to be activated or deactivated, refer to the descriptions of the foregoing format 3. For how the form of the bitmap indicates to activate or deactivate the at least one secondary cell associated with the activated cell group, refer to the descriptions of the foregoing format (1) in this solution.

In a possible manner, as shown in FIG. 12, R represents a reserved field, and a T0 field and a T1 field indicate an identifier of an activated cell group or a deactivated cell group. For a process of indicating, by using the T0 field and the T1 field, to activate or deactivate a cell group, refer to the foregoing descriptions. A difference is that in this example, if the T0 field and the T1 field indicate to activate a cell group, the foregoing fields of C1 to C7 in FIG. 12 may further indicate to activate or deactivate seven secondary cells associated with the activated cell group. Similarly, if the T0 field and the T1 field indicate to activate a plurality of cell groups, a bitmap of Ci may sequentially indicate, in a sequence of cell group identifiers, to activate or deactivate at least one secondary cell associated with the activated cell groups.

Step 603: The UE activates and/or deactivates the at least one cell group based on the first message.

In a design, the UE may send first data to the base station through a first cell group in the activated state in the plurality of cell groups of the UE. If the UE changes the first cell group from the activated state to the deactivated state based on the first message, the UE may perform at least one of the following operations, to implement lossless data transmission in a cell group activation and/or deactivation process.

1. If the UE receives no success acknowledgment of the first data, where this may include that the UE receives no acknowledgment (ACK) of the first data, or the UE receives a negative acknowledgment (NACK) of the first data, the UE retransmits the first data to the base station through a second cell group in an activated state in the plurality of cell groups of the UE, where the first data may be considered as a payload, a load, or the like, to avoid a loss, of the first data, caused by deactivation of the first cell group. Optionally, the method may further include: The UE may further send subsequent data of the first data to the base station through the second cell group.

For example, the "success acknowledgment" may be an ACK acknowledgment of an RLC entity. For example, after receiving the first data, the base station may feed back, to the UE through a state report of the RLC entity, that the first data is successfully received. "Retransmission" may be performed for data whose "success acknowledgment" is not received, or starting from the 1st piece of data whose "success acknowledgment" is not received, the data may be retransmitted sequentially in ascending order of sequence numbers of the data.

2. For second data that has not been transmitted in the first cell group, the UE sends the second data to the base station through the second cell group. According to the foregoing design, data that is not delivered to the first cell group is delivered to the second cell group for transmission, to avoid a loss, of the data, caused by deactivation of the first cell group.

The triple connectivity architecture is used as an example. If a cell group activated by the UE is changed from the secondary cell group 1 to the secondary cell group 2 based on the first message, for a transmitting end, if a "success acknowledgment" of a bottom layer has not been received, data that has been delivered to the secondary cell group 1 is delivered to the secondary cell group 2 for transmission or retransmission, to avoid a loss, of the data, caused by deactivation of the secondary cell group 1. Alternatively, if a cell group activated by the UE is changed from the master cell group and the secondary cell group 1 to the secondary cell group 2 based on the first message, for a transmitting end, if a "success acknowledgment" of a bottom layer has not been received, a data packet that has been delivered to the master cell group and the secondary cell group 1 is delivered to the secondary cell group 2 for transmission or retransmission, to avoid a loss, of the data, caused by deactivation of the master cell group and the secondary cell group 1. Alternatively, if a cell group activated by the UE is changed from the master cell group and the secondary cell group 1 to the secondary cell group 1 based on the first message, for a transmitting end, if a "success acknowledgment" of a bottom layer has not been received, data that has been delivered to the master cell group is delivered to the secondary cell group 1 for transmission or retransmission, to avoid a loss, of the data, caused by deactivation of the master cell group. Optionally, data that has been transmitted through the secondary cell group 1 is not specially processed, and only data transmitted through the master cell group is processed in the foregoing manner.

The following describes the foregoing lossless transmission process with reference to a protocol stack architecture of the UE. For a UE protocol stack, refer to FIG. 2*a*.

In a design, for one RB, a plurality of RLC entities may be established, and each cell group may be associated with different RLC entities. The triple connectivity architecture is used as an example. For each RB, three RLC entities may be established, and indexes are sequentially 0 to 2. An RLC entity 0 may be associated with the master cell group, an RLC entity 1 may be associated with the secondary cell group 1, and an RLC entity 2 may be associated with the secondary cell group 2. In this embodiment of this application, the following two protocol stack architectures are provided.

In a first protocol stack architecture, a PDCP entity anchor is not changed. That the PDCP entity anchor is not changed may mean that when the first cell group of the UE is changed from the activated state to the deactivated state, a PDCP entity reestablishment process does not occur in the UE, and a security key of a PDCP entity is not changed. The security key may be a security key used by the PDCP entity for encryption and/or integrity protection. The security key of the PDCP entity may be associated with any cell group of the UE, and the any cell group may be referred to as a third cell group. The third cell group may be the first cell group, the second cell group, or the like of the UE. This is not limited.

In this embodiment of this application, when the UE changes the first cell group from the activated state to the deactivated state based on the first message, and the second cell group is in the activated state, an entity to which the PDCP entity sends the first data and/or the second data is changed from a first RLC entity associated with the first cell group to a second RLC entity associated with the second cell group. A PDCP security key of the first data and/or a PDCP security key of the second data are/is not changed.

In a second protocol stack architecture, a PDCP entity anchor is changed. That the PDCP entity anchor is changed may mean that when the first cell group of the UE is changed from the activated state to the deactivated state, a PDCP entity reestablishment process occurs in the UE. A security key of a PDCP entity is changed from a first security key to a second security key. The first security key is associated with the first cell group, and the second security key is associated with the second cell group.

In this embodiment of this application, when the UE changes the first cell group from the activated state to the deactivated state based on the first message, and the second cell group is in the activated state, the PDCP entity before the change sends the first data to a first RLC entity associated with the first cell group, and the PDCP entity after the change sends the first data and/or the second data to a second RLC entity associated with the second cell group. Optionally, a PDCP security key of the first data and/or a PDCP security key of the second data are/is changed. For example, before the change, encryption and/or integrity protection are/is performed on the first data and/or the second data by using the first security key of the PDCP entity. After the change, encryption and/or integrity protection are/is performed on the first data and/or the second data by using the second security key of the PDCP entity.

Similar to the foregoing descriptions, this embodiment of this application further provides a base station protocol stack architecture, to ensure lossless transmission of downlink data in a cell group activation and/or deactivation process. At least the following architectures are included.

In a first protocol stack architecture, a PDCP anchor is not changed.

As shown in FIG. 13, in a design, in a scenario in which the PDCP anchor is not changed, a base station in multi-connectivity with UE may include a PDCP entity, and the PDCP entity may be located in any one of base stations in multi-connectivity with the UE or a shared CU in multi-connectivity with the UE (for details, refer to FIG. 5*b*). A triple connectivity scenario is used as an example. The PDCP entity may be located in a master node, a secondary node 1, a secondary node 2, or the like. When a cell group activated and/or deactivated by the UE is changed, a location of the PDCP entity anchor is not changed, and an RLC entity to which the PDCP entity delivers downlink data is changed. The foregoing example is still used. In the triple connectivity scenario, a master cell group is associated with an RLC entity 0, a secondary cell group 1 is associated with an RLC entity 1, and a secondary cell group 2 is associated with an RLC entity 2. In this embodiment of this application, when the cell group activated by the UE is changed from the master cell group and the secondary cell group 1 to the secondary cell group 2, the entity to which the PDCP entity delivers the downlink data is changed from the RLC entity 0 and the RLC entity 1 to the RLC entity 2, and a PDCP security key of the downlink data is not changed.

In a second protocol stack architecture, a PDCP anchor is changed.

As shown in FIG. 14, in a design, in a scenario in which the PDCP anchor is changed, a base station in multi-connectivity with UE may include a plurality of PDCP entities. A triple connectivity scenario is used as an example. A master node, a secondary node 1, and a secondary node 2 may each include a PDCP entity. For ease of differentiation, the three PDCP entities may be referred to as a PDCP entity 0, a PDCP entity 1, and a PDCP entity 2. In addition, the master node, the secondary node 1, and the secondary node 2 may each also include an RLC entity, and the three RLC entities may be respectively referred to as an RLC entity 0, an RLC entity 1, an RLC entity 2. In this case, the master node includes the PDCP entity 0 and the RLC entity 0, the secondary node 1 includes the PDCP entity 1 and the RLC entity 1, and the secondary node 2 includes the PDCP entity 2 and the RLC entity 2. If a master cell group is in an activated state, the PDCP entity 0 delivers downlink data to the RLC entity 0. If the secondary cell group 1 is in an activated state, the PDCP entity 1 delivers downlink data to the RLC entity 1. If the secondary cell group 2 is in an activated state, the PDCP entity 2 delivers downlink data to the RLC entity 2. In a scenario, if both the secondary cell group 1 and the secondary cell group 2 are changed to be in a deactivated state, only the master cell group continuous keeping in the activated state. To avoid a data loss, the PDCP entity 1 and the PDCP entity 2 may send, to the PDCP entity 0, first data whose success acknowledgment is not received and/or second data that has not been transmitted in the secondary cell group 1 and the secondary cell group 2. The PDCP entity 0 sends the first data and/or the second data to the RLC entity 0. It should be noted that for the first data, during initial transmission, a PDCP security key of the PDCP entity 1 or the PDCP entity 2 is used, and during retransmission, a PDCP security key of the PDCP entity 0 is used. The PDCP security key is changed. Further, if the UE changes any one of at least one cell group from the activated state to the deactivated state based on the first message, where for ease of description, the any cell group may be referred to as a cell group 1, the UE may further perform at least one of the following operations:

1. On a cell associated with the deactivated cell group 1, the UE skips monitoring a physical downlink control channel (PDCCH), skips receiving a downlink shared channel (DL-SCH), skips sending a channel sounding reference signal (SRS), skips sending an uplink shared channel (UL-SCH), and deactivates a semi-persistent resource on the cell associated with the cell group 1 or suspends the semi-persistent resource on the cell associated with the cell group 1. For example, deactivating the semi-persistent resource on the cell associated with the cell group 1 may mean that when the cell group 1 is reactivated, the semi-persistent resource cannot be automatically activated, and the base station needs to re-deliver an activation indication to activate the semi-persistent resource. For example, suspending the semi-persistent resource on the cell associated with the cell group 1 may include: When the cell group 1 is reactivated, the semi-persistent resource is resumed to the activated state, and the semi-persistent resource can be activated without requiring the base station to re-deliver an instruction. According to the foregoing design, when the cell group 1 is deactivated, the foregoing operations are not performed on the cell associated with the deactivated cell group 1, so that power consumption of the UE can be reduced.
2. The UE performs at least one of the following operations: maintaining uplink synchronization or downlink synchronization of the cell group 1, detecting a link status, or the like. In this manner, the UE may monitor link quality in real time, so that when the cell group 1 is reactivated, the UE can learn of the link quality in time, to ensure that data transmission is not interrupted. Specifically, the operation performed by the UE may include at least one of the following:

The UE measures a downlink reference signal on at least one cell associated with the deactivated cell group 1. For example, downlink synchronization may be maintained by detecting a downlink synchronization signal.

The UE measures the downlink reference signal on the cell associated with the deactivated cell group 1, and feeds back the link quality. For example, the link quality may include RSRP or RSRQ. Optionally, the link quality fed back by the UE may be indicated by channel state information (CSI) reported by the activated cell group.

The UE performs beam failure detection on the at least one cell associated with the deactivated cell group 1. For example, when it is detected that downlink quality is lower than a preconfigured threshold, a quantity of beam failures is counted. Optionally, when the quantity of beam failures reaches a preconfigured maximum value, beam failure resumption may be triggered. For example, the activated cell group triggers random access or sends a MAC CE to indicate that the beam failure occurs. Optionally, a reference signal corresponding to a beam direction with better link quality may be further indicated.

The UE performs radio link monitoring (RLM) on the cell associated with the deactivated cell group 1 to collect statistics on a quantity of radio link quality exceptions. Optionally, when the quantity of radio link quality exceptions reaches a preconfigured maximum value, radio link failure (RLF) resumption may be triggered. For example, the activated cell group triggers an RRC reestablishment process to select a cell with better link quality to access or sends failure information, to indicate an identifier of a cell group on which the RLF occurs, so that the base station adjusts the cell group, for example, deactivates the cell group on which the RLF occurs.

The UE maintains, on the cell associated with the deactivated cell group 1, an uplink timing advance timer (TAT) associated with the cell. The TAT may also be referred to as a TAT associated with the first cell group. During running of the uplink timing advance timer, the UE considers that uplink of the cell is in a synchronization state. When the uplink timing advance timer expires, the UE considers that uplink of the cell is in an out-of-synchronization state, and an uplink timing advance (TA) value of the first cell group is invalid. The following process needs to be triggered to obtain a new TA value of the first cell group for uplink transmission.

In some possible solutions, the UE may send indication information through the activated cell group, to indicate the base station to send a TA value of the deactivated cell group 1. After receiving the indication information, the base station delivers the TA value of the deactivated cell group 1. After receiving the TA value, the UE considers that uplink of the deactivated cell group 1 is in the synchronization state again.

Alternatively, in some other possible solutions, the UE may actively trigger a random access process to obtain a TA value. For example, the UE may trigger the random access process on the deactivated cell group (namely, the cell group 1). A random access resource may be configured for the UE in advance, and the UE may use the random access resource when determining that uplink of the deactivated cell group 1 is in the out-of-synchronization state. The base station delivers, in the random access process, the TA value corresponding to the deactivated cell group 1. After receiving the TA value, the UE considers that the uplink of the deactivated cell group 1 is in the synchronization state again. Optionally, when the UE needs to actively trigger the random access process, the UE may switch, from the activated cell group to the deactivated cell group 1, a radio frequency (RF) chain, a radio frequency unit (RF unit), or a module unit required by a radio frequency, so that the UE performs the random access process. After the process ends, the UE may re-switch, from the deactivated cell group 1 to the activated cell group, the radio frequency link, the radio frequency unit, or the module unit required by the radio frequency, to ensure data transmission on the activated cell group.

Optionally, in the foregoing two solutions, after the UE obtains a new TA value of the deactivated cell group 1, the UE may further restart the uplink timing advance timer. Optionally, after the UE obtains the TA value, the UE may actively activate the cell group 1, or keep the cell group 1 being in the deactivated state.

Optionally, in a current state, if new data in the UE arrives at the cell group 1, the UE may send indication information to a network device through the activated cell group, to indicate the network device to activate the cell group 1; or the UE may send a scheduling request (SR) to a network device through the cell group 1, to request the network device to activate the cell group 1.

3. The UE performs at least one of the following operations: skipping maintaining uplink synchronization or downlink synchronization of the cell group 1, skipping detecting a link status, or the like. In this manner, power consumption of the UE can be reduced. Specifically, the operation performed by the UE may include at least one of the following:

The UE skips measuring a downlink reference signal on at least one cell associated with the deactivated cell group 1.

The UE skips performing beam failure detection on the at least one cell associated with the deactivated cell group 1.

The UE skips performing radio link monitoring RLM on the at least one cell associated with the deactivated cell group 1.

The UE skips maintaining a TAT on the at least one cell associated with the deactivated cell group 1. If new data in the UE arrives at the cell group 1, the following solutions may be performed: In a solution, the UE may report indication information through an activated cell group, to indicate the base station to activate the cell group 1. Optionally, the base station further needs to send a TA value to the UE. Alternatively, in another solution, the UE actively triggers a random access process on the cell group 1, so that the base station perceives that the cell group 1 needs to enter the activated state again, and the base station sends, to the UE, indication information for activating the cell group 1. Optionally, the base station further needs to send a TA value to the UE.

The UE maintains the TAT on the at least one cell associated with the deactivated cell group 1. In a possible implementation, it is assumed that the UE continues running the TAT after the cell group 1 is deactivated, and new data in the UE arrives at the cell group 1. In this case, in a solution, if the TAT is running, the UE may report the indication information through the activated cell group, to indicate the base station to activate the cell group 1. Alternatively, the UE actively triggers an SR message on the deactivated cell group 1, so that the base station perceives that the cell group 1 needs to enter the activated state again, and the base station activates the cell group 1. Alternatively, in another possible implementation, if the UE no longer runs the TAT after the cell group 1 is deactivated, for an operation performed by the UE when new data in the UE arrives at the cell group 1, refer to the foregoing operation in which "the UE skips maintaining the TAT".

Embodiment 2

Embodiment 2 of this application provides a communication method. In the method, a function of a master cell group may be configured for a secondary cell group of UE. In this way, when there is no master cell group in activated cell groups of the UE, the secondary cell group having the function of the master cell group may be changed to the master cell group. Embodiment 2 may be used in combination with the Embodiment 1, or may be used independently. This is not limited.

Figure 15:
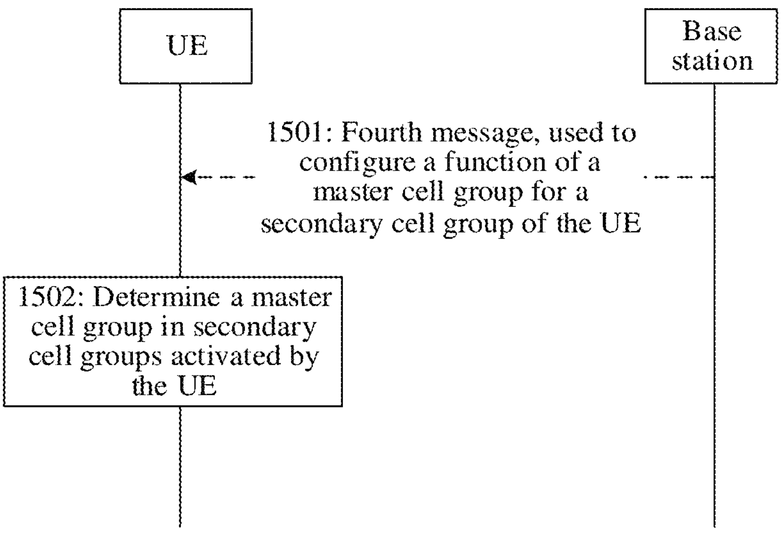
FIG. 15 is a flowchart of a communication method according to Embodiment 2 of this application.

As shown in FIG. 15, a process of the communication method is provided, and includes at least the following steps.

Optionally, step 1501: Abase station sends a fourth message to the UE, where the fourth message is used to configure the function of the master cell group for the secondary cell group of the UE. Optionally, the function of the master cell group includes at least one of the following: a signaling radio bearer (SRB) function, which is used to send an SRB message and may include an SRB1 configuration, an SRB2 configuration, or the like; and a master cell group failure resume function, which is used to trigger a failure indication when an RLF occurs on the master cell group, to avoid RRC reestablishment, or the like.

For example, the fourth message may be an air interface message, for example, an RRC message or a MAC message, or may be an RRC reconfiguration message, an RRC connection establishment message, or the like. In a design, when receiving the fourth message, the UE does not immediately validate the function of the master cell group for the corresponding secondary cell group, and only stores the function of the master cell group.

Step 1502: Determine a master cell group in secondary cell groups activated by the UE.

In a design, the method in Embodiment 2 may be combined with the method in Embodiment 1. For example, after the UE performs, based on a first message, an operation of activating and/or deactivating a cell group, if there is no master cell group in cell groups activated by the UE, the UE may determine the master cell group in the activated secondary cell groups. In an example, the UE may determine the master cell group in the activated secondary cell groups according to a predefined rule. For example, the predefined rule may include: When the master cell group is deactivated, if a secondary cell group 1 and a secondary cell group 2 are in an activated state, the secondary cell group 2 is a new master cell group. Alternatively, when the master cell group is deactivated, and only a secondary cell group 1 is in an activated state, the secondary cell group 1 is a new master cell group. In another example, the UE may receive primary cell validation indication information from the base station, and determine, based on the master cell group validation indication information, the master cell group in the secondary cell groups activated by the UE. In other words, in this manner, the base station may indicate a specific secondary cell group that is of the UE and that can be changed to the master cell group. If the base station indicates the secondary cell group 1 to be changed to the master cell group, the UE changes the secondary cell group 1 to the master cell group; or if the base station indicates the secondary cell group 2 to be changed to the master cell group, the UE changes the secondary cell group 2 to the master cell group. It should be noted that the primary cell validation indication information may be independently sent by the base station, or carried in the fourth message in step 1501 for sending. This is not limited. The primary cell validation indication information is essentially a piece of indication information that indicates a secondary cell group, in the secondary cell groups activated by the UE, that can be changed to the master cell group. The master cell group validation indication information may also be referred to as indication information or another name. This is not limited.

According to the foregoing method, when there is no master cell group in the cell groups activated by the UE, the activated secondary cell group may be changed to the master cell group, to ensure that the function of the master cell group is not interrupted, thereby ensuring continuity of data transmission.

Figure 16:
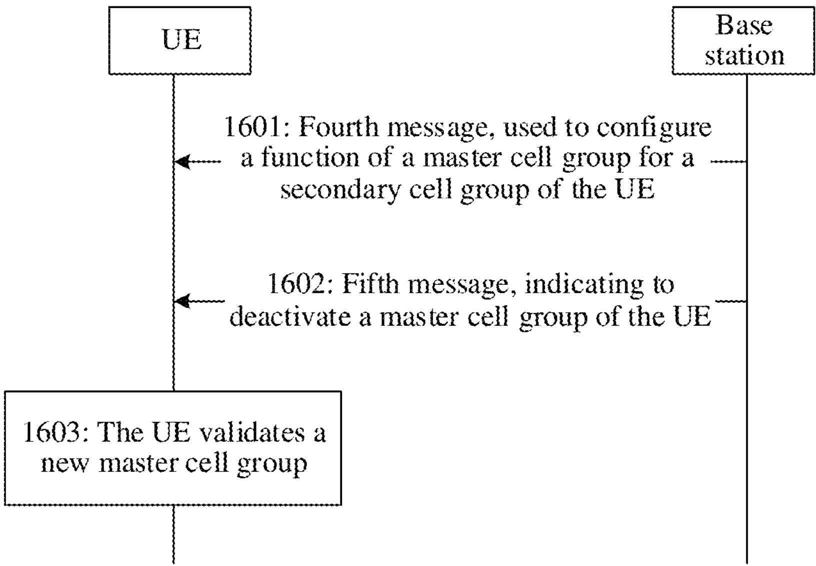
FIG. 16 is another flowchart of a communication method according to Embodiment 2 of this application.

As shown in FIG. 16, a process of the communication method is provided. The process may be an example of the process shown in FIG. 15, and includes at least the following steps.

Step 1601: The UE receives a fourth message from a base station, where the fourth message may be a master cell group configuration message, and the fourth message is used to configure the function of the master cell group for the secondary cell group of the UE.

Step 1602: The UE receives a fifth message from the base station, where the fifth message may be a primary cell group deactivation indication, and the fifth message indicates the UE to deactivate a master cell group of the UE.

Step 1603: The UE validates a new master cell group.

In a design, the UE may validate, according to a predefined rule, the new master cell group in the activated secondary cell group having the function of the master cell group. Alternatively, the fourth message carries a primary cell validation indication, and the UE may validate the new master cell group based on the primary cell validation indication. Alternatively, the fifth message may carry an identifier of a secondary cell group that can be changed to the master cell group, and the UE may validate the new master cell group based on the identifier of the secondary cell group. This is not limited.

Embodiment 3

Embodiment 3 of this application provides a communication method. In the method, different traffic steering rules can be configured for different cell groups of UE, and subsequently, the UE may select a matched traffic steering rule based on different activated cell groups, so that the traffic steering rule matches a channel status, to improve communication performance. Embodiment 3 may be used in combination with Embodiment 1 and/or Embodiment 2, or may be used independently. This is not limited.

Figure 17:
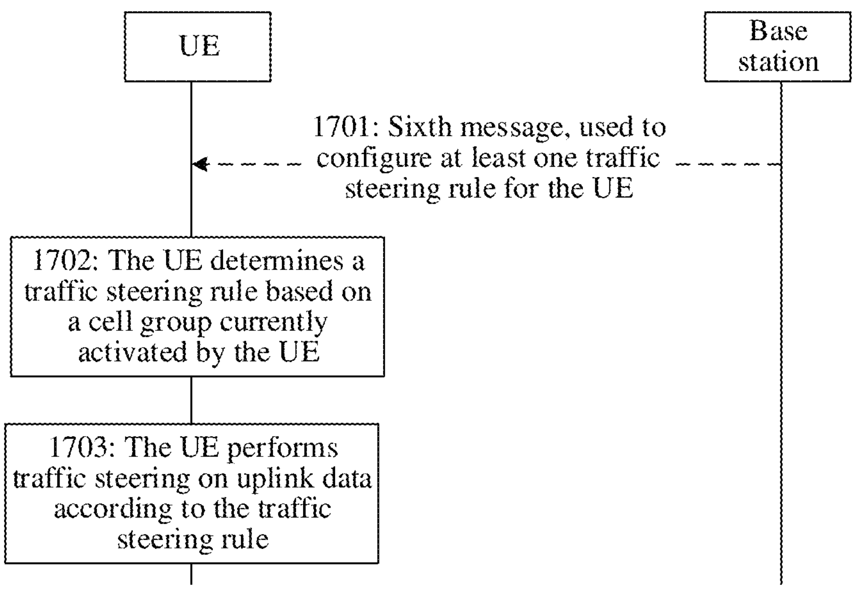
FIG. 17 is a flowchart of a communication method according to Embodiment 3 of this application.

As shown in FIG. 17, a process of the communication method is provided, and includes at least the following steps.

Optionally, step 1701: The UE receives a sixth message from a base station, where the sixth message may be a traffic steering rule configuration message, and the sixth message is used to configure at least one traffic steering rule for the UE. For example, the sixth message may be an air interface message, for example, an RRC message or a MAC message, or may be an RRC reconfiguration message, an RRC connection establishment message, or the like.

In a design, the at least one traffic steering rule may be related to an activated cell group or a deactivated cell group of the UE, and is applicable to activation or deactivation of different cell groups. For example, the at least one traffic steering rule includes:

Traffic steering rule 1: is applicable to a case in which a master cell group and a secondary cell group 1 are activated. To be specific, in a scenario in which the master cell group and the secondary cell group 1 of the UE are activated, the UE may perform traffic steering on uplink data according to the traffic steering rule 1. For example, the traffic steering rule 1 may be a data volume threshold. When to-be-sent data of the UE exceeds the threshold, the UE may send the uplink data through the master cell group and the secondary cell group 1; otherwise, the UE sends the uplink data only through the master cell group or the secondary cell group 1.

Traffic steering rule 2: is applicable to a case in which a master cell group and a secondary cell group 2 are activated. To be specific, in a scenario in which the master cell group and the secondary cell group 2 of the UE are activated, the UE may perform traffic steering on uplink data according to the traffic steering rule 2. For example, the traffic steering rule 2 may be a data volume threshold. When to-be-sent data of the UE exceeds the threshold, the UE may send the uplink data through the master cell group and the secondary cell group 2; otherwise, the UE sends the uplink data only through the master cell group or the secondary cell group 2.

Traffic steering rule 3: is applicable to a case in which a secondary cell group 1 and a secondary cell group 2 are activated. To be specific, in a scenario in which the secondary cell group 1 and the secondary cell group 2 of the UE are activated, the UE may perform traffic steering on uplink data according to the traffic steering rule 3. For example, the traffic steering rule 3 may be a data volume threshold. When to-be-sent data of the UE exceeds the threshold, the UE may send the uplink data through the secondary cell group 1 and the secondary cell group 2; otherwise, the UE sends the uplink data only through the secondary cell group 1 or the secondary cell group 2. Optionally, for the foregoing scenario in which the secondary cell group 1 and the secondary cell group 2 are activated, the method in Embodiment 2 may be used to select a secondary cell group from the two activated secondary cell groups, and change the secondary cell group to the master cell group.

Step 1702: The UE determines a traffic steering rule based on a cell group currently activated by the UE.

It can be learned from the foregoing descriptions of step 1701 that the selected traffic steering rule may be related to the activated cell group of the UE. Therefore, in step 1702, the UE may select a corresponding traffic steering rule from the at least one traffic steering rule based on the currently activated cell group.

Step 1703: The UE performs traffic steering on the uplink data according to the traffic steering rule.

It can be learned from the foregoing descriptions that the UE may dynamically adjust the traffic steering rule based on different activated cell groups, so that the traffic steering rule adapts to a network load, a channel status, and the like, to improve communication performance.

Figure 18:
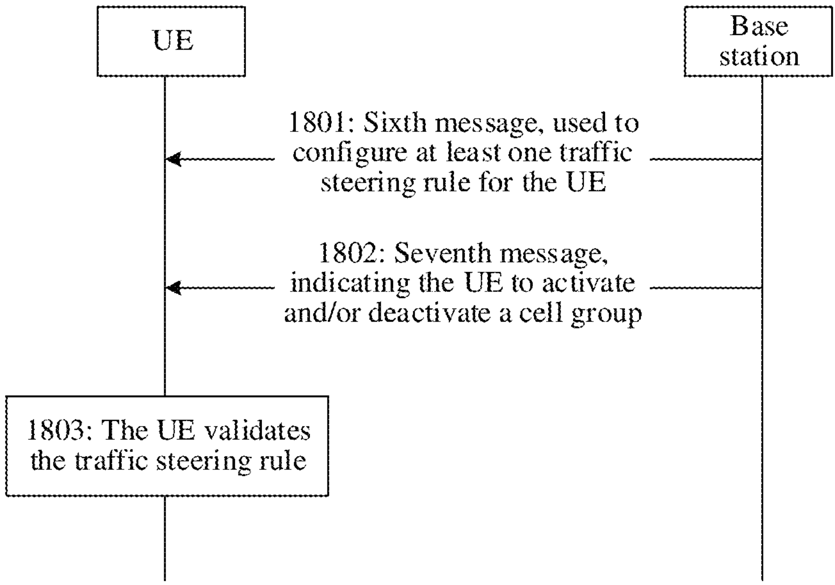
FIG. 18 is another flowchart of a communication method according to Embodiment 3 of this application.

As shown in FIG. 18, a process of the communication method is provided. The process may be an example of the process shown in FIG. 17, and includes at least the following steps.

Step 1801: A base station sends a sixth message to the UE, where the sixth message may be referred to as a traffic steering rule configuration message, and the sixth message is used to configure at least one traffic steering rule for the UE.

Step 1802: The base station sends a seventh message to the UE, where the seventh message may be referred to as indication information for activating and/or deactivating a cell group. For a format of the seventh message, refer to the first message in Embodiment 1. The seventh message may indicate the UE to activate and/or deactivate the cell group.

Step 1803: The UE validates the traffic steering rule.

In a dual connectivity architecture, when a secondary cell group is deactivated, the UE can send uplink data only through a master cell group. However, according to the method in this embodiment of this application, in a triple connectivity architecture, a case of an activated cell group can be flexibly adapted, and a most appropriate traffic steering rule can be used.

For Embodiment 1 to Embodiment 3, it should be noted that:

1. The foregoing descriptions focus on differences between Embodiment 1, Embodiment 2, and Embodiment 3. For other content except the differences, refer to each other.
2. Not all steps shown in the flowcharts described in Embodiment 1 to Embodiment 3 are mandatory steps, and some steps may be added or deleted based on the flowcharts according to actual requirements. For example, step 600 and step 601 may be selectively performed.
3. In the descriptions of Embodiment 1 to Embodiment 3, an example in which a hardware device is used as a whole is used for description, and actions of modules in the hardware device are not described. To support the hardware device as a whole in implementing related functions described in the foregoing embodiments, operations between internal modules of the hardware device also fall within the protection scope of embodiments of this application.

For example, in a design, as an open radio access network (O-RAN) is proposed, a function of an access network device may be implemented by a plurality of universal standard modules. For example, in Embodiment 1, as a whole, actions of the base station may include: The base station sends the configuration message to the UE, receives the assistance message from the UE, sends the first message to the UE, and the like. If a function of the base station is implemented by a CU module or a DU module, the foregoing process may include: The CU generates the configuration message or the first message, and sends the configuration message or the first message to the UE through the DU. The DU receives the assistance message from the UE, sends the assistance message to the CU, and the like.

4. For ease of understanding, in the descriptions of Embodiment 1 to Embodiment 3, names such as the UE and the base station are directly used. It may be understood that the base station may be referred to as an access network device, and the UE may be referred to as a terminal device. For the access network device and the terminal device, refer to the descriptions in FIG. 1.

The foregoing describes in detail the method provided in embodiments of this application with reference to FIG. 1, FIG. 2*a* to FIG. 2*d*, FIG. 3, FIG. 4*a* to FIG. 4*c*, FIG. 5*a*, FIG. 5*b*, and FIG. 6 to FIG. 18. The following describes in detail an apparatus provided in embodiments of this application with reference to FIG. 19 to FIG. 21. It should be understood that descriptions of apparatus embodiments correspond to the descriptions of the method embodiments. Therefore, for content that is not described in detail, refer to the descriptions in the foregoing method embodiments.

Figure 19:
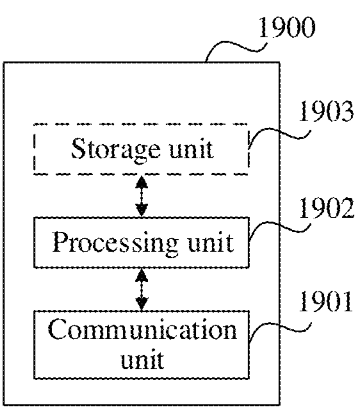
FIG. 19 is a schematic diagram of an apparatus according to an embodiment of this application.

FIG. 19 is a possible block diagram of an apparatus according to an embodiment of this application. As shown in FIG. 19, an apparatus 1900 may include a communication unit 1901, configured to support communication between the apparatus and another device. Optionally, the communication unit 1901 is also referred to as a transceiver unit, and may include a receiving unit and/or a sending unit that are respectively configured to perform a receiving operation and a sending operation. The processing unit 1902 is configured to support the apparatus in performing processing. Optionally, the apparatus 1900 may further include a storage unit 1903, configured to store program code and/or data of the apparatus 1900.

In an example, the apparatus 1900 may be a terminal device, or a module, a chip, or a circuit in the terminal device. The communication unit 1901 is configured to perform receiving and sending operations of the UE in the foregoing method Embodiment 1 to Embodiment 3. The processing unit 1902 is configured to perform processing-related operations of the UE in the foregoing method Embodiment 1 to Embodiment 3.

The communication unit 1901 is configured to send first data to a network device through at least one cell group in an activated state in a plurality of cell groups of the terminal device. The communication unit 1901 is further configured to receive a first message from the network device, where the first message is used to deactivate a first cell group. The processing unit 1902 is configured to change an activated state of the first cell group from the activated state to a deactivated state based on the first message. The communication unit 1901 is further configured to: when the terminal device receives no success acknowledgment of the first data and/or there is second data that has not been transmitted in the first cell group, retransmit the first data and/or send the second data to the network device through a second cell group in an activated state in the plurality of cell groups.

In a possible design, when the first cell group is changed from the activated state to the deactivated state, a packet data convergence protocol PDCP entity anchor of the terminal device is not changed, and an entity to which a PDCP entity sends the first data and/or the second data is changed from a first radio link control layer RLC entity associated with the first cell group to a second RLC entity associated with the second cell group; or when the first cell group is changed from the activated state to the deactivated state, a PDCP entity anchor of the terminal device is changed, a PDCP entity before the change sends the first data to a first RLC entity associated with the first cell group, and the PDCP entity after the change retransmits the first data and/or sends the second data to a second RLC entity associated with the second cell group.

In a possible design, that a PDCP entity anchor is changed includes: A security key of the PDCP entity is changed from a first PDCP security key to a second PDCP security key, the first PDCP security key is associated with the first cell group, and the second PDCP security key is associated with the second cell group. Alternatively, that a PDCP entity anchor is not changed includes: A security key of the PDCP entity is not changed, and the security key is associated with the first cell group and/or the second cell group.

In a possible design, when the first cell group is in the deactivated state, maintaining uplink synchronization on the first cell group specifically includes: running an uplink timing advance timer TAT associated with the first cell group, where when the TAT expires, a timing advance TA value of the first cell group is invalid, and a new TA value of the first cell group is obtained.

In a possible design, that the new TA value of the first cell group is obtained includes: sending indication information to the network device through the second cell group, where the indication information indicates the network device to send the new TA value of the first cell group; and receiving a TA value from the network device through the second cell group, where the TA value is the new TA value of the first cell group.

In a possible design, that the new TA value of the first cell group is obtained includes: initiating random access to the network device through the first cell group; and receiving, through the first cell group, a TA value sent by the network device in a random access process, where the TA value is the new TA value of the first cell group.

In a possible design, when new data in the terminal device arrives at the first cell group, the communication unit 1901 is further configured to: send indication information to the network device through the second cell group, where the indication information indicates the network device to activate the first cell group; or send a scheduling request SR to the network device through the first cell group, to request the network device to activate the first cell group.

In a possible design, when the first cell group is in the deactivated state, and uplink synchronization is not maintained on the first cell group, if new data in the terminal device arrives at the first cell group, the communication unit 1901 is further configured to:

send indication information to the network device through the second cell group, where the indication information indicates the network device to activate the first cell group; or initiate random access to the network device through the first cell group, to enable the network device to determine that the first cell group of the terminal device needs to enter the activated state.

In a possible design, the communication unit 1901 is further configured to: send a second message to the network device, where the second message is used to assist the network device in activating and/or deactivating at least one of the plurality of cell groups of the terminal device, and the second message indicates at least one of the following: a link status of the at least one cell group of the terminal device, at least one cell group recommended by the terminal device to be activated and/or deactivated, a case in which there is to-be-sent data in the at least one cell group of the terminal device, or a data volume of the to-be-sent data in the at least one cell group of the terminal device.

In a possible design, the communication unit 1901 is further configured to receive a third message from the network device, where the third message is used to configure the plurality of cell groups for the terminal device.

In a possible design, the communication unit 1901 is further configured to receive indication information from the network device. The processing unit 1902 is configured to determine, based on the indication information, a master cell group in secondary cell groups activated by the terminal device.

In a possible design, the communication unit 1901 is further configured to receive a fourth message from the network device, where the fourth message is used to configure a function of the master cell group for the secondary cell group of the terminal device, and the secondary cell group having the function of the master cell group is changed to the master cell group.

In another example, the apparatus 1900 may be a network device, or a module, a chip, or a circuit in the network device. The communication unit 1901 is configured to perform receiving and sending operations of the base station in the foregoing method Embodiment 1 to Embodiment 3. The processing unit 1902 is configured to perform processing-related operations of the base station in the foregoing method Embodiment 1 to Embodiment 3.

For example, the communication unit 1901 is configured to send first data to a terminal device through a first cell group in an activated state in a plurality of cell groups of the terminal device. The communication unit 1901 is further configured to send a first message to the terminal device, where the first message is used to deactivate the first cell group. The communication unit 1901 is further configured to: when the network device does not send a success acknowledgment of the first data and/or there is second data that has not been transmitted in the first cell group, receive the first data and/or the second data from the terminal device through a second cell group in an activated state in the plurality of cell groups.

In a possible design, when the first cell group is in a deactivated state, the terminal device maintains uplink synchronization on the first cell group, and if a timing advance TA value of the first cell group is invalid, the communication unit 1901 is further configured to receive indication information from the terminal device through the second cell group, where the indication information indicates the network device to send a new TA value of the first cell group. The communication unit 1901 is further configured to send the new TA value of the first cell group to the terminal device through the second cell group.

In a possible design, when the first cell group is in a deactivated state, the terminal device maintains uplink synchronization on the first cell group, and if a TA value of the first cell group is invalid, the communication unit 1901 is further configured to receive, through the first cell group, random access initiated by the terminal device. The communication unit 1901 is further configured to send a new TA value of the first cell group to the terminal device through the first cell group in a random access process.

In a possible design, when new data in the terminal device arrives at the first cell group, the communication unit 1901 is further configured to: send indication information to the terminal device through the second cell group, where the indication information indicates the terminal device to activate the first cell group; or receive a scheduling request SR from the terminal device through the first cell group. The processing unit 1902 is configured to activate the first cell group of the terminal device.

In a possible design, when the first cell group is in a deactivated state, the terminal device does not maintain uplink synchronization on the first cell group, and when new data in the terminal device arrives at the first cell group, the communication unit 1901 is further configured to: send indication information to the terminal device through the second cell group, where the indication information indicates the network device to activate the first cell group; or receive, through the first cell group, random access initiated by the terminal device. The processing unit 1902 is configured to activate the first cell group of the terminal device.

In a possible design, the communication unit 1901 is further configured to send a second message to the terminal device, where the second message is used to assist the network device in activating and/or deactivating at least one of the plurality of cell groups of the terminal device, and the second message indicates at least one of the following: a link status of the at least one cell group of the terminal device, at least one cell group recommended by the terminal device to be activated and/or deactivated, a case in which there is to-be-sent data in the at least one cell group of the terminal device, or a data volume of the to-be-sent data in the at least one cell group of the terminal device.

In a possible design, the communication unit 1901 is further configured to send a third message to the terminal device, where the third message is used to configure the plurality of cell groups for the terminal device.

In a possible design, the communication unit 1901 is further configured to send indication information to the terminal device, where the indication information is used to determine a master cell group in secondary cell groups activated by the terminal device.

In a possible design, the communication unit 1901 is further configured to send a fourth message to the terminal device, where the fourth message is used to configure a function of the master cell group for the secondary cell group of the terminal device, and the secondary cell group having the function of the master cell group is changed to the master cell group.

It should be understood that division of units in the foregoing apparatus is merely logical function division. During actual implementation, all or some of the units may be integrated into one physical entity, or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. In an implementation process, operations in the foregoing methods or the foregoing units may be implemented through a hardware integrated logic circuit in the processor element, or may be implemented in a form in which the processing element invokes software.

In an example, a unit in any one of the foregoing apparatuses may be one or more integrated circuits configured to implement the foregoing method, for example, one or more application-specific integrated circuits (ASICs), one or more digital signal processors (DSPs), one or more field programmable gate arrays (FPGAs), or a combination of at least two of these forms of integrated circuits. For another example, when the units in the apparatus may be implemented in a form in which a processing element schedules a program, the processing element may be a processor, for example, a general-purpose central processing unit (CPU) or another processor that can invoke the program. For another example, the units may be integrated and implemented in a form of a system-on-a-chip (SOC).

The foregoing unit configured for receiving is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing unit configured for sending is an interface circuit of the apparatus, and is configured to send a signal to another apparatus. For example, when the apparatus is implemented in a manner of a chip, the sending unit is an interface circuit that is of the chip and that is configured to send a signal to another chip or apparatus.

Figure 20:
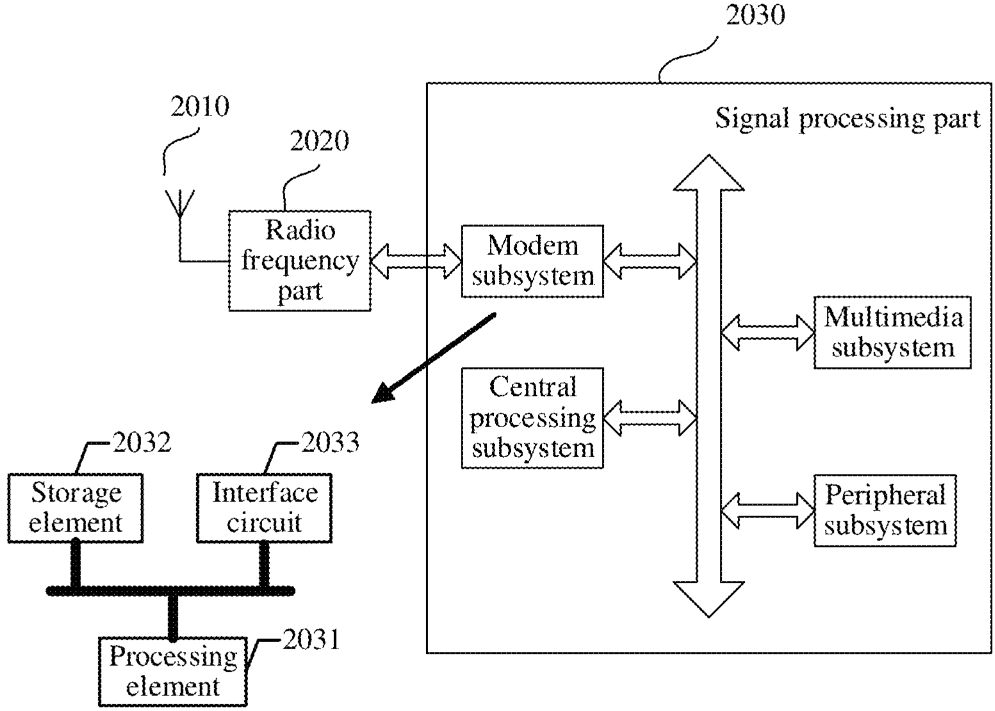
FIG. 20 is a schematic diagram of a terminal device according to an embodiment of this application.

FIG. 20 is a schematic structural diagram of a terminal device according to an embodiment of this application. As shown in FIG. 20, the terminal device includes an antenna 2010, a radio frequency part 2020, and a signal processing part 2030. The antenna 2010 is connected to the radio frequency part 2020. In a downlink direction, the radio frequency part 2020 receives, through the antenna 2010, information sent by a network device, and sends, to the signal processing part 2030 for processing, the information sent by the network device. In an uplink direction, the signal processing part 2030 processes information of the terminal device, and sends the information to the radio frequency part 2020. The radio frequency part 2020 processes the information of the terminal device, and then sends the processed information to the network device through the antenna 2010.

The signal processing part 2030 may include a modem subsystem, configured to implement processing on each communication protocol layer of data. The signal processing part 2030 may further include a central processing subsystem, configured to implement processing on an operating system and an application layer of the terminal device. In addition, the signal processing part 2030 may further include another subsystem, for example, a multimedia subsystem and a peripheral subsystem. The multimedia subsystem is configured to implement control on a camera, a screen display, and the like of the terminal device, and the peripheral subsystem is configured to implement connection to another device. The modem subsystem may be a separately disposed chip.

The modem subsystem may include one or more processing elements 2031, for example, include a main control CPU and another integrated circuit. In addition, the modem subsystem may further include a storage element 2032 and an interface circuit 2033. The storage element 2032 is configured to store data and a program. However, a program used to perform the method performed by the terminal device in the foregoing method may not be stored in the storage element 2032, but is stored in a memory outside the modem subsystem, and is loaded and used by the modem subsystem when to be used. The interface circuit 2033 is configured to communicate with another subsystem.

The modem subsystem may be implemented through a chip. The chip includes at least one processing element and an interface circuit. The processing element is configured to perform the steps of any method performed by the terminal device. The interface circuit is configured to communicate with another apparatus. In an implementation, a unit used by the terminal device to implement the steps in the foregoing method may be implemented in a form of scheduling a program by a processing element. For example, an apparatus used for the terminal device includes a processing element and a storage element, and the processing element invokes a program stored in the storage element, to perform the method performed by the terminal device in the foregoing method embodiment. The storage element may be a storage element, namely, an on-chip storage element, that is located on a same chip as the processing element.

In another implementation, a program used to perform the method performed by the terminal device in the foregoing method may be on a storage element, namely, an off-chip storage element, that is located on a different chip from the processing element. In this case, the processing element invokes or loads a program to the on-chip storage element from the off-chip storage element, to invoke and perform the method performed by the terminal device in the foregoing method embodiment.

In still another implementation, a unit used by the terminal device to implement the steps in the foregoing method may be configured as one or more processing elements. The processing elements are disposed in the modem subsystem. The processing element herein may be an integrated circuit, for example, one or more ASICs, one or more DSPs, one or more FPGAs, or a combination of the types of integrated circuits. The integrated circuits may be integrated together to form a chip.

Units used by the terminal device to implement the steps in the foregoing method may be integrated and implemented in a form of an SOC. The SOC chip is configured to implement the foregoing method. At least one processing element and a storage element may be integrated into the chip, and the processing element invokes a program stored in the storage element to implement the foregoing method performed by the terminal device. Alternatively, at least one integrated circuit may be integrated into the chip, to implement the foregoing method performed by the terminal device. Alternatively, with reference to the foregoing implementations, functions of some units may be implemented by a program invoked by the processing element, and functions of some units are implemented by the integrated circuit.

It can be learned that the foregoing apparatus used for the terminal device may include at least one processing element and an interface circuit. The at least one processing element is configured to perform any method that is performed by the terminal device and that is provided in the foregoing method embodiment. The processing element may perform some or all steps performed by the terminal device, in a first manner, to be specific, by invoking the program stored in the storage element; or may perform some or all steps performed by the terminal device, in a second manner, to be specific, by using a hardware integrated logical circuit in the processing element in combination with instructions; or may certainly perform, by combining the first manner and the second manner, some or all steps performed by the terminal device.

The processing element herein is the same as that described above, and may be implemented through a processor. A function of the processing element may be the same as a function of the processing unit described in FIG. 19. For example, the processing element may be a general-purpose processor, for example, a CPU, or may be one or more integrated circuits configured to implement the foregoing method, for example, one or more ASICs, one or more digital signal processors DSPs, or one or more FPGAs, or a combination of at least two of the integrated circuit forms. The storage element may be implemented through a memory, and a function of the storage element may be the same as a function of the storage unit described in FIG. 19. The storage element may be a memory, or may be a general name of a plurality of memories.

The terminal device shown in FIG. 20 can implement the processes related to the UE in the foregoing method embodiments. Operations and/or functions of the modules in the terminal device shown in FIG. 20 are respectively used to implement corresponding processes in the foregoing method embodiments. For details, refer to the descriptions in the foregoing method embodiments. To avoid repetition, detailed descriptions are properly omitted herein.

Figure 21:
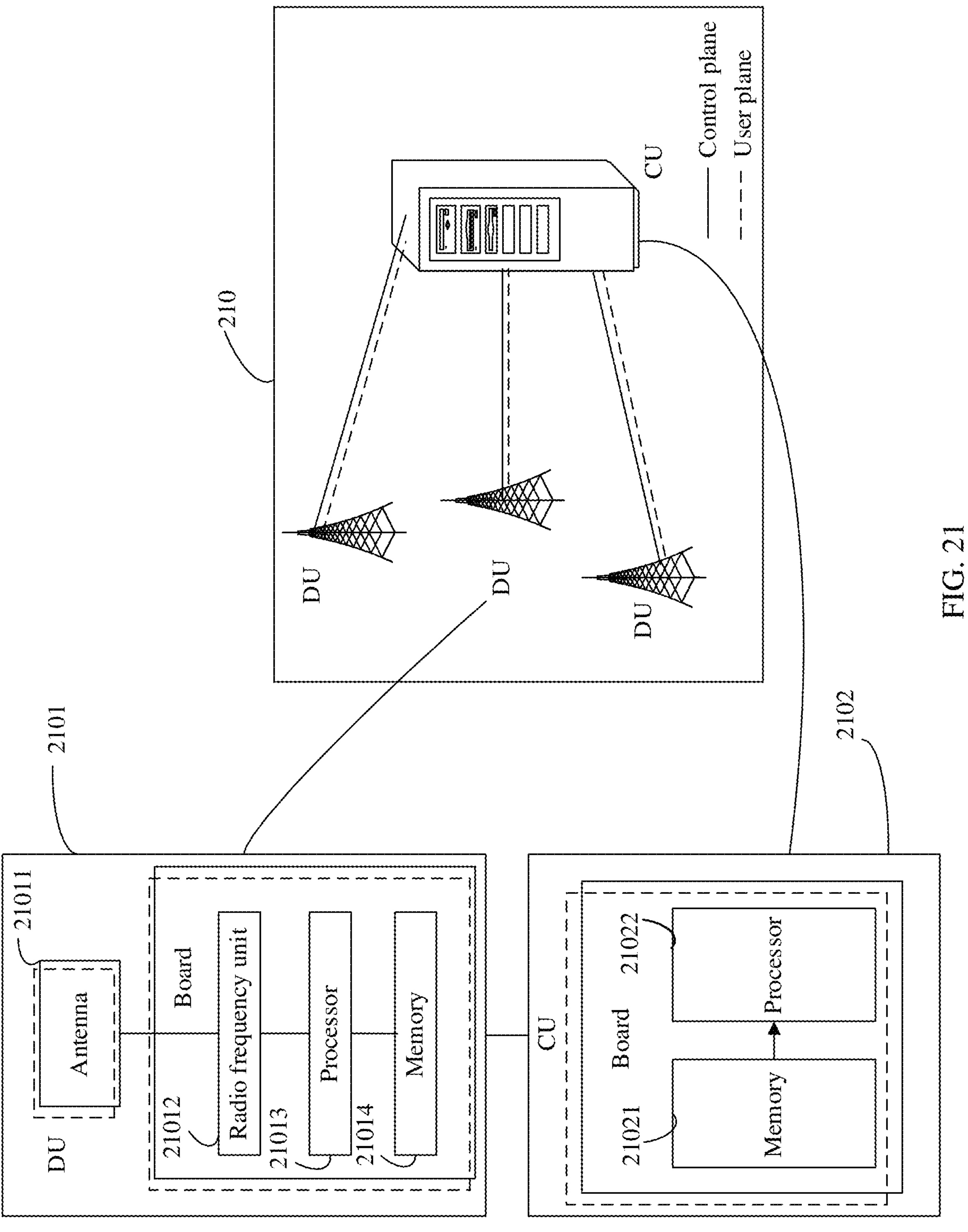
FIG. 21 is a schematic diagram of an access network device according to an embodiment of this application.

FIG. 21 is a schematic structural diagram of a network device according to an embodiment of this application. The network device may be an access network device (for example, a base station). The access network device 210 may include one or more DUs 2101 and one or more CUs 2102. The DU 2101 may include at least one antenna 21011, at least one radio frequency unit 21012, at least one processor 21013, and at least one memory 21014. The DU 2101 is mainly configured to: receive and send a radio frequency signal, convert a radio frequency signal and a baseband signal, and perform some baseband processing. The CU 2102 may include at least one processor 21022 and at least one memory 21021.

The CU 2102 is mainly configured to: perform baseband processing, control the access network device, and the like. The DU 2101 and the CU 2102 may be physically disposed together, or may be physically separate, that is, in a distributed base station. The CU 2102 is a control center of the access network device, may also be referred to as a processing unit, and is mainly configured to complete a baseband processing function. For example, the CU 2102 may be configured to control the access network device to perform the operation process of the access network device in the foregoing method embodiments.

In addition, optionally, the access network device 210 may include one or more radio frequency units, one or more DUs, and one or more CUs. The DU may include at least one processor 21013 and at least one memory 21014. The radio frequency unit may include at least one antenna 21011 and at least one radio frequency unit 21012. The CU may include at least one processor 21022 and at least one memory 21021.

In an instance, the CU 2102 may include one or more boards. A plurality of boards may jointly support a radio access network (for example, a 5G network) with a single access indication, or may separately support radio access networks (for example, an LTE network, a 5G network, or another network) of different access standards. The memory 21021 and the processor 21022 may serve one or more boards. In other words, a memory and a processor may be disposed on each board. Alternatively, the plurality of boards may share a same memory and a same processor. In addition, a necessary circuit may further be disposed on each board. The DU 2101 may include one or more boards. A plurality of boards may jointly support a radio access network (for example, a 5G network) with a single access indication, or may separately support radio access networks (for example, an LTE network, a 5G network, or another network) of different access standards. The memory 21014 and the processor 21013 may serve one or more boards. In other words, a memory and a processor may be disposed on each board. Alternatively, the plurality of boards may share a same memory and a same processor. In addition, a necessary circuit may further be disposed on each board.

The access network device shown in FIG. 21 can implement the processes related to the base station in the foregoing method embodiments. Operations and/or functions of the modules in the access network device shown in FIG. 21 are respectively used to implement corresponding processes in the foregoing method embodiments. For details, refer to the descriptions in the foregoing method embodiments. To avoid repetition, detailed descriptions are properly omitted herein.

The terms "system" and "network" may be used interchangeably in embodiments of this application. "At least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, "at least one of A, B, or C" includes A, B, C, AB, AC, BC, or ABC. In addition, unless otherwise specified, ordinal numbers such as "first" and "second" mentioned in embodiments of this application are used to distinguish between a plurality of objects, but are not used to limit a sequence, a time sequence, priorities, or importance of the plurality of objects.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto the computer or another programmable data processing device, so that a series of operations and steps are performed on the computer or another programmable device, to generate computer-implemented processing. Therefore, the instructions executed on the computer or the another programmable device provide steps for implementing a specific function in one or more processes in the flowcharts and/or in one or more blocks in the block diagrams.

It is clearly that a person skilled in the art can make various modifications and variations to this application without departing from the spirit and scope of this application. In this way, this application is intended to cover these modifications and variations of this application provided that they fall within the scope of the claims of this application and their equivalent technologies.

The invention claimed is:

1. A communication method, performed by a communication apparatus, wherein the communication apparatus is a terminal device or a hardware apparatus configured to implement a function of the terminal device, the method comprises:

sending first data to a network device through a first cell group in an activated state in a plurality of cell groups of the terminal device;

receiving a first message from the network device, wherein the first message indicates to deactivate the first cell group;

changing a state of the first cell group from the activated state to a deactivated state based on the first message; and at least one of in response to the communication apparatus receiving no success acknowledgment of the first data, retransmitting the first data to the network device through a second cell group in an activated state in the plurality of cell groups, or in response to the communication apparatus having second data to be transmitted through the first cell group, sending the second data to the network device through the second cell group in the activated state in the plurality of cell groups, wherein in response to the first cell group being changed from the activated state to the deactivated state, a packet data convergence protocol (PDCP) entity anchor of the communication apparatus is not changed, and an entity to which a PDCP entity sends at least one of the first data or the second data is changed from a first radio link control layer (RLC) entity associated with the first cell group to a second RLC entity associated with the second cell group.

2. The method according to claim 1, wherein in response to the first cell group being changed from the activated state to the deactivated state, the PDCP entity anchor is not changed by not changing a security key of the PDCP entity, wherein the security key is associated with at least one of the first cell group or the second cell group.

3. The method according to claim 1, wherein while the first cell group is in the deactivated state, the communication apparatus maintains uplink synchronization on the first cell group by running an uplink timing advance timer (TAT) associated with the first cell group.

4. The method according to claim 3, wherein upon expiry of the TAT, a timing advance (TA) value of the first cell group is invalid, and the communication apparatus obtains a new TA value of the first cell group.

5. The method according to claim 3, wherein, in response to existence of new data to be sent via the first cell group, the method further comprises:

sending indication information to the network device through the second cell group, wherein the indication information indicates the network device to activate the first cell group; or sending a scheduling request (SR) to the network device through the first cell group, to request the network device to activate the first cell group.

6. The method according to claim 1, wherein, while the first cell group is in the deactivated state, and the communication apparatus does not maintain uplink synchronization on the first cell group, in response to new data in the communication apparatus arriving at the first cell group, the method further comprises:

sending indication information to the network device through the second cell group, wherein the indication information indicates the network device to activate the first cell group; or initiating random access to the network device through the first cell group, to enable the network device to determine that the first cell group of the terminal device needs to enter the activated state.

7. A communication apparatus, wherein the communication apparatus is a terminal device or an apparatus configured to implement a function of the terminal device, the communication apparatus comprises at least one processor configured to control the communication apparatus to:

send first data to a network device through a first cell group in an activated state in a plurality of cell groups of the terminal device;

receive a first message from the network device, wherein the first message indicates to deactivate the first cell group;

change a state of the first cell group from the activated state to a deactivated state based on the first message; and at least one of in response to the communication apparatus receiving no success acknowledgment of the first data, retransmit the first data to the network device through a second cell group in an activated state in the plurality of cell groups, or in response to the communication apparatus having second data to be transmitted through the first cell group, send the second data to the network device through the second cell group in the activated state in the plurality of cell groups, wherein in response to the first cell group being changed from the activated state to the deactivated state, a packet data convergence protocol (PDCP) entity anchor of the communication apparatus is not changed, and an entity to which a PDCP entity sends at least one of the first data or the second data is changed from a first radio link control layer (RLC) entity associated with the first cell group to a second RLC entity associated with the second cell group.

8. The apparatus according to claim 7, wherein in response to the first cell group being changed from the activated state to the deactivated state, the PDCP entity anchor is not changed by not changing a security key of the PDCP entity, wherein the security key is associated with at least one of the first cell group or the second cell group.

9. The apparatus according to claim 7, wherein while the first cell group is in the deactivated state, the at least one processor is further configured to control the communication apparatus to:

maintain uplink synchronization on the first cell group by running an uplink timing advance timer (TAT) associated with the first cell group.

10. The apparatus according to claim 9, wherein the at least one processor is further configured to control the communication apparatus to:

upon expiry of the TAT and a timing advance (TA) value of the first cell group being invalid, obtain a new TA value of the first cell group.

11. The apparatus according to claim 9, wherein, in response to existence of new data to be sent via the first cell group, the at least one processor is further configured to control the communication apparatus to:

send indication information to the network device through the second cell group, wherein the indication information indicates the network device to activate the first cell group; or send a scheduling request (SR) to the network device through the first cell group, to request the network device to activate the first cell group.

12. The apparatus according to claim 7, wherein, while the first cell group is in the deactivated state, and the communication apparatus does not maintain uplink synchronization on the first cell group, in response to new data in the communication apparatus arriving at the first cell group, the at least one processor is further configured to control the communication apparatus to:

send indication information to the network device through the second cell group, wherein the indication information indicates the network device to activate the first cell group; or initiate random access to the network device through the first cell group, to enable the network device to determine that the first cell group of the terminal device needs to enter the activated state.

13. A non-transitory computer-readable medium storing a program executable by a terminal device or a processor of the terminal device for causing the terminal device to perform operations comprising:

sending first data to a network device through a first cell group in an activated state in a plurality of cell groups of the terminal device;

receiving a first message from the network device, wherein the first message indicates to deactivate the first cell group;

changing a state of the first cell group from the activated state to a deactivated state based on the first message; and at least one of in response to the terminal device receiving no success acknowledgment of the first data, retransmitting the first data to the network device through a second cell group in an activated state in the plurality of cell groups, or in response to the terminal device having second data to be transmitted through the first cell group, sending the second data to the network device through the second cell group in the activated state in the plurality of cell groups, wherein in response to the first cell group being changed from the activated state to the deactivated state, a packet data convergence protocol (PDCP) entity anchor of the terminal device is not changed, and an entity to which a PDCP entity sends at least one of the first data or the second data is changed from a first radio link control layer (RLC) entity associated with the first cell group to a second RLC entity associated with the second cell group.

14. The non-transitory computer-readable medium according to claim 13, wherein in response to the first cell group being changed from the activated state to the deactivated state, the PDCP entity anchor is not changed by not changing a security key of the PDCP entity, wherein the security key is associated with at least one of the first cell group or the second cell group.

15. The non-transitory computer-readable medium according to claim 13, wherein while the first cell group is in the deactivated state, the operations further comprise:

maintaining uplink synchronization on the first cell group by running an uplink timing advance timer (TAT) associated with the first cell group.

16. The non-transitory computer-readable medium according to claim 15, the operations further comprise:

upon expiry of the TAT and a timing advance (TA) value of the first cell group being invalid, obtaining a new TA value of the first cell group.

17. The non-transitory computer-readable medium according to claim 15, wherein, in response to existence of new data to be sent via the first cell group, the operations further comprise:

sending indication information to the network device through the second cell group, wherein the indication information indicates the network device to activate the first cell group; or sending a scheduling request (SR) to the network device through the first cell group, to request the network device to activate the first cell group.

* * * * *